(12) United States Patent
Barker

(10) Patent No.: US 9,827,643 B2
(45) Date of Patent: Nov. 28, 2017

(54) MACHINE VISION BASED SAWMILL AUDIT SYSTEM

(75) Inventor: Earl Barker, Enumclaw, WA (US)

(73) Assignee: Weyerhaeuser NR Company, Seattle, WA (US)

(*) Notice: Subject to any disclaimer, the term of this patent is extended or adjusted under 35 U.S.C. 154(b) by 1125 days.

(21) Appl. No.: 13/413,460

(22) Filed: Mar. 6, 2012

(65) Prior Publication Data

US 2012/0227866 A1    Sep. 13, 2012

Related U.S. Application Data

(60) Provisional application No. 61/450,011, filed on Mar. 7, 2011.

(51) Int. Cl.
| | | |
|---|---|---|
| *G01N 21/86* | (2006.01) | |
| *B23Q 17/20* | (2006.01) | |
| *B23Q 17/24* | (2006.01) | |
| *B27B 1/00* | (2006.01) | |
| *B27B 31/00* | (2006.01) | |

(52) U.S. Cl.
CPC ............ *B23Q 17/20* (2013.01); *B23Q 17/24* (2013.01); *B27B 1/007* (2013.01); *B27B 31/00* (2013.01)

(58) Field of Classification Search
CPC ......... B23Q 17/24; B27B 1/007; B27B 31/00; B27B 7/04; B23D 59/008; B23D 45/105
USPC ..................................... 144/357; 250/559.36
See application file for complete search history.

(56) References Cited

U.S. PATENT DOCUMENTS

| | | |
|---|---|---|
| 3,890,509 A | 6/1975 | Maxey |
| 3,931,589 A | 1/1976 | Aisenberg et al. |
| 4,139,035 A | 2/1979 | Bystedt et al. |
| 4,188,544 A | 2/1980 | Chasson |
| 4,221,974 A | 9/1980 | Mueller et al. |
| 4,437,367 A | 3/1984 | Hauser |
| 4,524,812 A | 6/1985 | Murphy |
| 4,541,722 A | 9/1985 | Jenks |
| 4,691,601 A | 9/1987 | Peddinghaus |
| 4,691,751 A | 9/1987 | Komulainen |
| 4,916,629 A | 4/1990 | Bogue et al. |
| 4,926,917 A | 5/1990 | Kirbach |
| 5,056,922 A | 10/1991 | Cielo et al. |
| 5,892,808 A | 4/1999 | Goulding et al. |
| 5,897,800 A | 4/1999 | Sawai et al. |

(Continued)

OTHER PUBLICATIONS

"Inx SeeCon SC2000 & SC2000L: True Real-Time Lumber Size Control System—Technical Considerations for Successful Installation," Inx Systems Technical Information, Inx-Systems, Inc., Cumming, Georgia, 2002, 8 pages.

(Continued)

*Primary Examiner* — Thanh Luu
(74) *Attorney, Agent, or Firm* — Perkins Coie LLP

(57) ABSTRACT

Sawmill auditing and control apparatus and methods employ information from one or more scan zones and/or controllers (e.g., PLCs). Boards may be logically associated with mill equipment which produced the boards, allowing defects or imperfections to be tied to certain equipment. For example, boards may be associated with a primary breakdown machine or a gangsaw, or with a pair of cutters (e.g., saws, chip heads). Such allows auditing of mill operations to identify improperly functioning machinery or out of tolerance conditions, to correct such, and/or provide notification.

20 Claims, 21 Drawing Sheets

(56) References Cited

U.S. PATENT DOCUMENTS

| | | | |
|---|---|---|---|
| 5,946,995 A | 9/1999 | Michell et al. | |
| 5,949,086 A | 9/1999 | Reponen et al. | |
| 6,041,683 A | 3/2000 | Timperi et al. | |
| 6,062,280 A | 5/2000 | Newnes et al. | |
| 6,064,035 A | 5/2000 | Toller et al. | |
| 6,094,269 A | 7/2000 | Ben-Dove et al. | |
| 6,127,649 A | 10/2000 | Toller et al. | |
| 6,333,795 B1 | 12/2001 | Kaji | |
| 6,382,062 B1 | 5/2002 | Smith | |
| 6,425,346 B1 | 7/2002 | Birk | |
| 6,437,357 B1 | 8/2002 | Weiss et al. | |
| 6,449,585 B1 | 9/2002 | Hyun et al. | |
| 6,463,402 B1 | 10/2002 | Bennett et al. | |
| 6,466,305 B1 | 10/2002 | McBain | |
| 6,598,477 B2 | 7/2003 | Floyd | |
| 6,618,155 B2 | 9/2003 | Metcalfe et al. | |
| 6,681,672 B2 | 1/2004 | Myrfield | |
| 6,757,058 B1 | 6/2004 | Carman et al. | |
| 6,773,552 B1 | 8/2004 | Albert et al. | |
| 6,988,439 B2 | 1/2006 | Liu et al. | |
| 7,134,465 B2 | 11/2006 | Herring et al. | |
| 7,200,458 B2 | 4/2007 | Carman et al. | |
| 7,227,165 B2 | 6/2007 | Hubert et al. | |
| 7,308,921 B1 | 12/2007 | Brewer, Sr. | |
| 7,406,190 B2 | 7/2008 | Carman et al. | |
| 7,426,422 B2 | 9/2008 | Carman et al. | |
| 7,660,443 B2 | 2/2010 | Azuma et al. | |
| 7,853,349 B2 | 12/2010 | Barker | |
| 2001/0034561 A1 | 10/2001 | Myrfield | |
| 2003/0079544 A1* | 5/2003 | Floyd | B27B 1/007 73/597 |
| 2004/0250917 A1 | 12/2004 | Kennedy et al. | |
| 2005/0013472 A1 | 1/2005 | Gauthier | |
| 2006/0053990 A1 | 3/2006 | Barker | |
| 2008/0029511 A1 | 2/2008 | Barker et al. | |
| 2009/0095377 A1 | 4/2009 | Barker | |
| 2009/0095378 A1 | 4/2009 | Barker | |
| 2009/0095379 A1* | 4/2009 | Barker | B23D 45/105 144/357 |
| 2009/0255607 A1 | 10/2009 | Barker | |

OTHER PUBLICATIONS

"INX SeeCon SC2000 On-Line Lumber Size Control System: Pay-back Time & Return-on-Investment," Inx-Systems, Inc., Cumming, Georgia, Dec. 12, 2001, 8 pages.

"Modern Mill-Wide Lumber Size Control: Methods and Components of a Complete Lumber Size Control System," Inx Systems Educational Information, Inx-Systems, Inc., Cumming, Georgia, 2002, 7 pages.

"Sawmill Operator's Guide to Greater Profits: Everything Profit-Conscious Management Needs to Know about New True Real-Time Lumber Size Control," Inx Systems Managerial Information, Inx-Systems, Inc., Cumming, Georgia, 2002, 13 pages.

"SeeCon True Real-Time Lumber Size Control System—Frequently Asked Questions," 2002, 7 pages.

"SeeCon: MillWide Lumber Size Control" USNR Brochure, 2004, 2 pages.

"Size Does Matter"—Perceptron—USNR News, May 2003:1-3.

Barker, "Sawmill Log Speed Adjustment System Using Saw Deflection Information," Office Action dated Mar. 15, 2007 for U.S. Appl. No. 10/942,575, 5 pages.

Barker, "Sawmill Log Speed Adjustment System Using Saw Deflection Information," Amendment filed Sep. 4, 2007 for U.S. Appl. No. 10/942,575, 6 pages.

Barker, "Sawmill Log Speed Adjustment System Using Saw Deflection Information," Office Action dated Nov. 2, 2007 for U.S. Appl. No. 10/942,575, 13 pages.

Barker, "Sawmill Log Speed Adjustment System Using Saw Deflection Information," Amendment filed May 2, 2008 for U.S. Appl. No. 10/942,575, 6 pages.

Barker, "Sawmill Log Speed Adjustment System Using Saw Deflection Information," Office Action dated Jun. 23, 2008 for U.S. Appl. No. 10/942,575, 12 pages.

Barker, "Systems and Methods for Monitoring a Saw Blade During Sawing," Office Action dated Jan. 27, 2010 for U.S. Appl. No. 11/873,101, 10 pages.

Barker, "Systems and Methods for Monitoring a Saw Blade During Sawing,"Amendment filed Apr. 22, 2010 for U.S. Appl. No. 11/873,101, 20 pages.

Barker, "Systems and Methods for Monitoring a Saw Blade During Sawing," Office Action dated May 10, 2010 for U.S. Appl. No. 11/873,101, 10 pages.

Barker, "Systems and Methods for Monitoring a Saw Blade During Sawing,"Amendment filed Jul. 23, 2010 for U.S. Appl. No. 11/873,101, 13 pages.

Barker, "Systems and Methods for Monitoring a Saw Blade During Sawing," Office Action dated Jun. 8, 2010 for U.S. Appl. No. 11/873,097, 11 pages.

Barker, "Systems and Methods for Monitoring a Saw Blade During Sawing," Amendment filed Aug. 5, 2010 for U.S. Appl. No. 11/873,097, 26 pages.

Barker, "Systems and Methods for Tracking Lumber in a Sawmill," Office Action dated Aug. 4, 2010 for U.S. Appl. No. 11/873,090, 9 pages.

Barker, "Systems and Methods for Tracking Lumber in a Sawmill," Amendment filed Jan. 4, 2011 for U.S. Appl. No. 11/873,090, 12 pages.

Barker, "Systems and Methods for Tracking Lumber in a Sawmill," Office Action mailed Mar. 23, 2011 for U.S. Appl. No. 11/873,090, 8 pages.

Barker, "Systems and Methods for Tracking Lumber in a Sawmill," Amendment filed May 23, 2011 for U.S. Appl. No. 11/873,090, 12 pages.

Barker, "Systems and Methods for Tracking Lumber in a Sawmill," Office Action dated Nov. 7, 2011 for U.S. Appl. No. 12/424,402, 9 pages.

Barker, "Systems and Methods for Tracking Lumber in a Sawmill," Amendment filed Feb. 3, 2012 for U.S. Appl. No. 12/424,402, 15 pages.

Barker, "Systems and Methods for Auditing Optimizers Tracking Lumber in a Sawmill," U.S. Appl. No. 13/366,028, filed Feb. 3, 2012, 46 pages.

Barker, "Systems and Methods for Tracking Lumber in a Sawmill," U.S. Appl. No. 13/529,549, filed Jun. 29, 2012, 66 pages.

* cited by examiner

MACHINE VISION BASED SAWMILL AUDIT SYSTEM

CROSS REFERENCE TO RELATED APPLICATIONS

This application claims benefit under 35 U.S.C. 119(e) to U.S. patent application Ser. No. 61/450,011 filed Mar. 7, 2011, which is incorporated herein by reference in its entirety.

BACKGROUND

Technical Field

This description generally relates to sawmills, and more particularly to monitoring the performance and efficiency of lumber manufacturing systems.

Description of the Related Art

The sawmill industry has become largely automated. Full length tree trunks are delivered to sawmills, where they are automatically debarked, scanned and cut into log segments based on their scanned geometry. These log segments are then typically processed at a number of automated stations, depending on the sawmill and the type of wood. These processing stations produce lumber from each log segment, often without any human intervention.

One of the first processing stations in many sawmills is the primary breakdown machine, which processes log segments to produce cants and sideboards. The primary breakdown machine typically includes chip heads for removing slabs as well as one or more band saws for removing sideboards from the log segments. Each log segment may be scanned prior to processing at the primary breakdown machine, and a primary breakdown computer optimizer may then determine an optimal mix of lumber that can be obtained from that log segment based on the scanned geometry. The computer optimizer may then rotate the log segment and control the relative position of the chip heads and band saws to achieve that optimal mix of lumber.

Downstream from the primary breakdown machine, cants may be further processed at a gangsaw to produce boards. Gangsaws typically include a number of parallel, circular saw blades located at precise intervals within a sawbox and, at the front of the sawbox, two chip heads (e.g., vertical drum chip heads) for removing excess wood from the outside of each cant. Cants may be transported in a straight line through the gangsaw using feed rolls on the upstream and downstream sides of the sawbox. Alternatively, the cants may be curve sawed. For example, the cant may be driven through the gangsaw along a curved sawing path during curve sawing. Alternatively, the sawbox may be moved during the cutting to produce a curved sawing path. In many sawmills, a cant scanner scans the incoming cants prior to processing by the gangsaw. A gangsaw computer optimizer then determines optimal locations for the chip heads and saw blades based on the scanned geometry of each cant.

Boards sawn by the gangsaw, as well as sideboards from the primary breakdown machine, may then be processed by an edger. The edger typically includes one or more saw blades for sawing along the length of the boards to achieve a chosen width. After edging, the boards are transported to a trimmer, where the boards can be trimmed to a final length. Both the edger and the trimmer may also have corresponding scanning systems and computer optimizers to determine how best to saw each piece of lumber.

At each processing station, an optimizer system makes determinations regarding the optimal way to saw each piece to maximize the value and volume of lumber produced from the raw logs. These optimizer systems are very complicated and expensive, and are also difficult to manage properly because of their complexity. If some portion of an optimizer system is not performing as expected, the sawmill can easily suffer a 1% to 4% loss of value until the problem is found and fixed. Thus, significant sums of money may be lost should any one optimizer system not function correctly.

Additionally, if some portion of the sawing system is not performing properly, the size of the pieces could be out of tolerance, causing the sawmill to suffer additional losses until the problems are found and fixed.

Thus, modern sawmills lack an effective way to determine if the processing stations are indeed functioning correctly and realizing optimal value from the raw resources. Consequently, there is a need for improvement.

BRIEF SUMMARY

A method of operation of a mill equipment audit system may be summarized as including receiving image information by a processor-based mill equipment audit processing system, the image information captured proximate an infeed of an edger by an edger infeed scanner; for each of a plurality of boards, characterizing a respective geometric shape of a perimeter of the respective board based on the received image information by the processor-based mill equipment audit processing system; and at least for any of the plurality of the boards having identified imperfections, logically associating the respective board with a piece of mill machinery which produced the respective board having the identified imperfections by the processor-based mill equipment audit processing system based on the characterization of the respective geometric shape of the perimeter of the board and an assumption that a log segment or cant from which the respective board was sawn is being processed in a horns down arrangement.

The method may further include capturing image information of the infeed of the edger by a single planar laser scanner. Receiving image information captured proximate an infeed of an edger by an edger infeed scanner may include receiving the image information only from the single planar laser scanner.

The method may further include capturing image information of the infeed of the edger by one planar laser scanner and two point laser scanners.

The method may further include capturing image information of a respective wide face of the boards. Characterizing a respective geometric shape of a perimeter of the respective board based on the received image information may include computationally determining whether the respective board has parallel edges along a length thereof. Characterizing a respective geometric shape of a perimeter of the respective board based on the received image information may include computationally determining an orientation of a sweep of the respective board, if any. Computationally determining an orientation of a sweep of the respective board, if any, may include computational dividing image information into cross sections at defined intervals, and detecting a lateral translation of the board as the board is traversed from a first end to a second end along a length thereof. Characterizing a respective geometric shape of a perimeter of the respective board based on the received image information may include computationally determining a width of the respective board. Logically associating the respective board with a piece of mill machinery which produced the respective board having the identified imperfections may include logically associating the respective board with one of a primary breakdown machine or a gangsaw of the mill.

The method may further include analyzing image data by the processor-based mill equipment audit processing system to computationally to identify imperfections; and providing at least one notification that indicates the piece of mill machinery which produced at least one of the boards having at least one identified imperfection.

A mill equipment audit system may be summarized as including an edger infeed scanner positioned to provide image information of an infeed of an edger; a processor-based mill equipment audit processing system communicatively coupled to the edger infeed scanner, and which includes at least one processor and at least one non-transitory processor-readable medium communicatively coupled to the at least one processor and which stores at least one of processor executable instructions or data, which when executed by the processor causes the at least one processor to: for each of a plurality of boards, characterize a respective geometric shape of a perimeter of the respective board based on the received image information; and at least for any of the plurality of the boards having identified imperfections, logically associate the respective board with a piece of mill machinery which produced the respective board having the identified imperfections based on the characterization of the respective geometric shape of the perimeter of the board and an assumption that a log segment or cant from which the respective board was sawn is being processed in a horns down arrangement. The edger infeed scanner may consist of a single planar laser scanner.

The mill equipment audit system may further include a pair of point laser scanners positioned at least proximate the infeed of the edger and communicatively coupled to the processor-based mill equipment audit processing system to provide image information thereto. The at least one processor may computationally determine an orientation of a sweep of the respective board, if any, as at least part of the characterization of the respective geometric shape of the perimeter of the respective board. The at least one processor may computationally determine whether the respective board has parallel edges along a length thereof as at least part of the characterization of the respective geometric shape of the perimeter of the respective board. The at least one processor may computationally determine a width of the respective board as at least part of the characterization of the respective geometric shape of the perimeter of the respective board. The at least one processor may logically associate the respective board with a specific one of a primary breakdown machine or a gangsaw in a data structure stored in a nontransistory readable medium.

A method of operation of a mill equipment audit system may be summarized as including receiving image information for each of a plurality of boards by a processor-based mill equipment audit processing system, the image information indicative of at least one dimension of each of the boards and an amount of wane, if any, on a face of the boards; characterizing each of at least some of the boards based on the received image information by the processor-based mill equipment audit processing system; and logically associating the respective board with a single pair of cutting devices which produced the respective board based on the characterization of at least the respective board by the processor-based mill equipment audit processing system. Logically associating the respective board with a single pair of cutting devices which produced the respective board may include logically associating the respective board with a pair of cutting devices selected from the group consisting of saw blades and chip headers. Logically associating the respective board with a single pair of cutting devices which produced the respective board may include logically associating the respective board with a specific pair of two saw blades or a specific pair of a chip head and a saw blade. Logically associating the respective board with a single pair of cutting devices which produced the respective board may include logically associating the respective board with a specific pair composed of two saw blades of a primary breakdown machine or one chip head and one saw blade of a primary breakdown machine. Logically associating the respective board with a single pair of cutting devices which produced the respective board may include logically associating in a data structure stored on at least one nontransitory processor-readable medium the respective board with a specific pair of two saw blades a gangsaw. Receiving image information for each of a plurality of boards may include receiving the image information from a single planer laser scanner positioned at least proximate an infeed of an edger of the mill. Receiving image information for each of a plurality of boards may further include receiving the image information from two point laser scanners positioned at least proximate an infeed of an edger of the mill. Receiving image information for each of a plurality of boards may further include receiving the image information from at least one planer laser scanner positioned at least proximate an outfeed of an edger of the mill. Receiving image information for each of a plurality of boards may further include receiving the image information from at least one laser scanner positioned at least proximate at least one of an infeed or an outfeed of a gangsaw of the mill.

A mill equipment audit system may be summarized as including an edger infeed scanner positioned to provide image information of an infeed of an edger; a processor-based mill equipment audit processing system communicatively coupled to at least the edger infeed scanner, and which includes at least one processor and at least one non-transitory processor-readable medium communicatively coupled to the at least one processor and which stores at least one of processor executable instructions or data, which when executed by the processor causes the at least one processor to: receive image information for each of a plurality of boards by a processor-based mill equipment audit processing system, the image information indicative of at least one dimension of each of the boards and an amount of wane, if any, on a face of the boards; characterize each of at least some of the boards based on the received image information by the processor-based mill equipment audit processing system; and logically associate the respective board with a single pair of cutting devices which produced the respective board based on the characterization of at least the respective board by the processor-based mill equipment audit processing system. The at least one processor may logically associate the respective board with a pair of cutting devices selected from the group consisting of saw blades and chip headers. The at least one processor may logically associate the respective board with a specific pair of two saw blades or a specific pair of a chip head and a saw blade. The at least one processor may logically associate the respective board with a specific pair composed of two saw blades of a primary breakdown machine or one chip head and one saw blade of a primary breakdown machine. The at least one processor may logically associate in a data structure stored on at least one nontransitory processor-readable medium the respective board with a specific pair of two saw blades a gangsaw. The edger infeed scanner may be a single planer laser scanner positioned at least proximate an edger of the mill.

The mill equipment audit system may further include two point laser scanners each positioned at least proximate an infeed of an edger of the mill and communicatively coupled to the at least one processor.

The mill equipment audit system may further include at least one planer laser scanner positioned at least proximate an outfeed of an edger of the mill and communicatively coupled to the at least one processor.

The mill equipment audit system may further include at least one laser scanner positioned at least proximate at least one of an infeed or an outfeed of a gangsaw of the mill and communicatively coupled to the at least one processor.

A method of operation of a mill equipment audit system may be summarized as including receiving image information by a processor-based mill equipment audit processing system; receiving position related information from a machine controller that controls at least one piece of mill machinery, the information indicative at least of a position of at least one cutting element relative to a piece of wood being cut for each of a plurality of pieces of wood; characterizing each of a plurality of boards based on the received image information and the received position information by the processor-based mill equipment audit processing system; and logically associating the respective board with a single pair of cutting devices which produced the respective board by the processor-based mill equipment audit processing system based on the characterization of at least the respective board. Receiving position related information from a machine controller that controls at least one piece of mill machinery may include receiving information from a gangsaw controller indicative of a sawing path of the gang saw with respect to a cant.

The method may further include for each of a number of sets of the boards: creating a virtual representation of a cant based at least in part of the image information; determining a saw path through the virtual representation of the cant based at least in part on the information indicative of a sawing path of the gang saw with respect to a chipped cant from which the boards of the respective set of boards have been sawn.

The method may further include based on image information indicative of an amount of wane appearing on at least some of the boards, creating a virtual representation of an original cant from which the chipped cant was produced.

The method may further include based in the virtual representation of the original cant, determining whether the original cant has two chipped sides, a chip left side and sawed right side, a sawed left side and chipped right side, or two sawed sides. Receiving position related information from a machine controller that controls at least one piece of mill machinery may include receiving information from a primary breakdown controller indicative of a position of at least one chip head with respect to a log segment.

The method may further include storing to at least one nontransitory processor-readable medium information indicative of a relationship between curvature, speed and sawing accuracy. Receiving image information by a processor-based mill equipment audit processing system may include receiving image information from a single planer laser scanner positioned at least proximate an infeed of an edger of the mill. Receiving image information by a processor-based mill equipment audit processing system may include receiving image information from two point laser scanners positioned at least proximate an infeed of an edger of the mill. Receiving image information by a processor-based mill equipment audit processing system may include receiving image information from at least one planer laser scanner positioned at least proximate an outfeed of an edger of the mill. Receiving image information by a processor-based mill equipment audit processing system may include receiving image information from at least one laser scanner positioned at least proximate at least one of an infeed or an outfeed of a gangsaw of the mill.

A mill equipment audit system may be summarized as including a number of scanner positioned to provide image information from each of a number of pieces of mill equipment; a processor-based mill equipment audit processing system communicatively coupled to the number of scanners, and which includes at least one processor and at least one non-transitory processor-readable medium communicatively coupled to the at least one processor and which stores at least one of processor executable instructions or data, which when executed by the processor causes the at least one processor to: receive image information by a processor-based mill equipment audit processing system; receive position related information from a machine controller that controls at least one piece of mill machinery, the information indicative at least of a position of at least one cutting element relative to a piece of wood being cut for each of a plurality of pieces of wood; characterize each of a plurality of boards based on the received image information and the received x information by the processor-based mill equipment audit processing system; and logically associate the respective board with a single pair of cutting devices which produced the respective board by the processor-based mill equipment audit processing system based on the characterization of at least the respective board. The at least one processor may receives information from a gangsaw controller indicative of a sawing path of the gang saw with respect to a cant.

The mill equipment audit system wherein the at least one processor may further, for each of a number of sets of the boards, create a virtual representation of a cant based at least in part of the image information; determine a saw path through the virtual representation of the cant based at least in part on the information indicative of a sawing path of the gang saw with respect to a chipped cant from which the boards of the respective set of boards have been sawn.

The mill equipment audit system wherein the at least one processor may further: create a virtual representation of an original cant from which the chipped cant was produced based on image information indicative of an amount of wane appearing on at least some of the boards.

The mill equipment audit system wherein the at least one processor may further: determine whether the original cant has two chipped sides, a chip left side and sawed right side, a sawed left side and chipped right side, or two sawed sides based in the virtual representation of the original cant. The at least one processor may receive information from a primary breakdown controller indicative of a position of at least one chip head with respect to a log segment.

The mill equipment audit system wherein the at least one processor may further: store to the at least one nontransitory processor-readable medium information indicative of a relationship between curvature, speed and sawing accuracy. The at least one processor may receive the image information from a single planer laser scanner positioned at least proximate an infeed of an edger of the mill. The at least one processor may receive the image information from two point laser scanners positioned at least proximate an infeed of an edger of the mill. The at least one processor may receive the image information from at least one planer laser scanner positioned at least proximate an outfeed of an edger of the mill. The at least one processor may receive the image information from at least one laser scanner positioned at least proximate at least one of an infeed or an outfeed of a gangsaw of the mill.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 18 is a schematic diagram of a computing device for use in the system of FIG. 1, according to one illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with sawmills, bucking and merchandizing processes, primary breakdown machines, gangsaws, edgers, trimmers, saws, computing devices, imaging systems and/or laser scanners have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the embodiments.

Description of an Example System for Auditing Sawmill Performance

Figure 1:
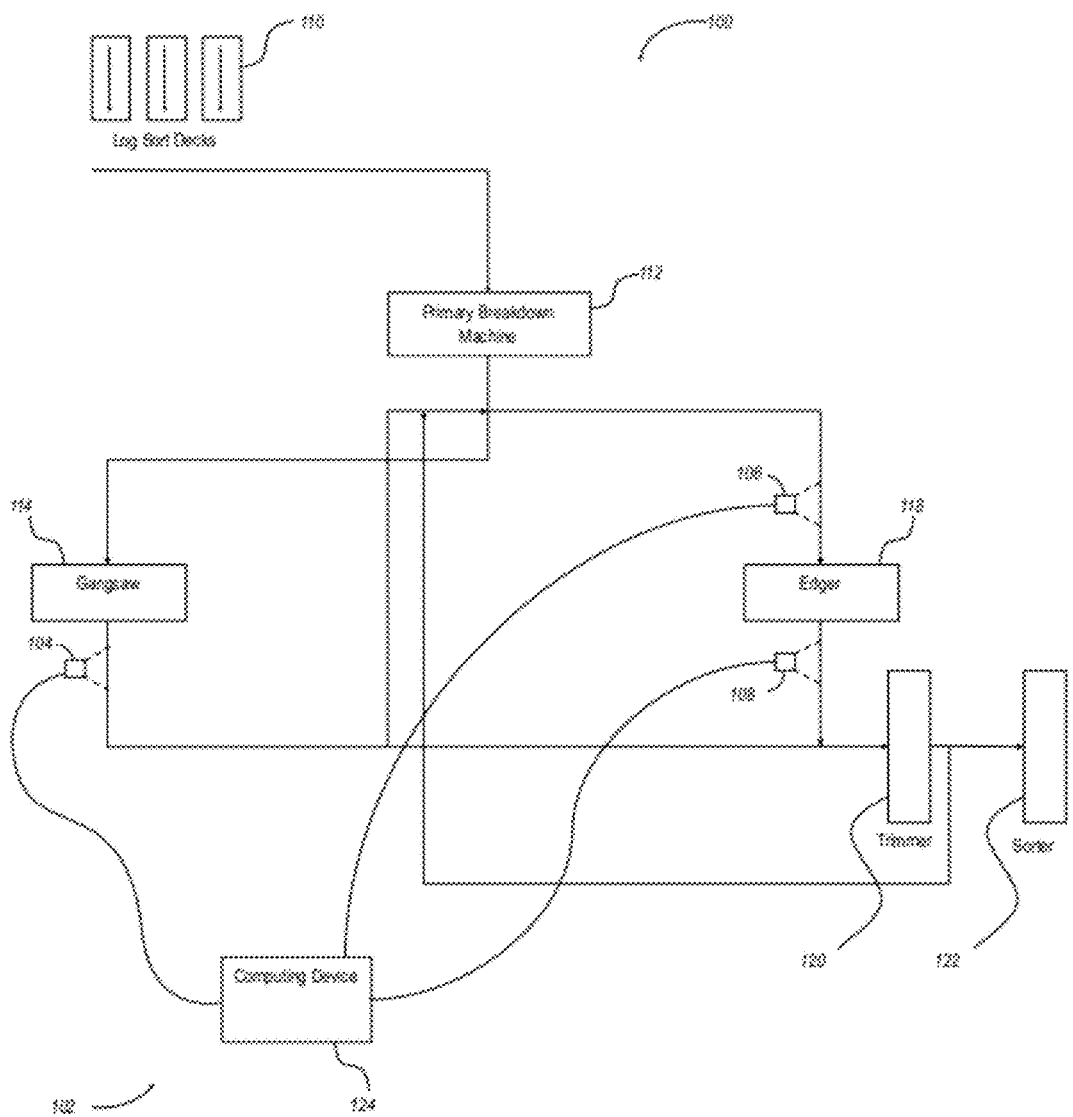
FIG. 1 is a schematic view of an example sawmill incorporating a system for tracking lumber, according to one illustrated embodiment.

FIG. 1 is a schematic view of an example lumber mill or sawmill 100 incorporating a system 102 that audits at least one machine center, according to one illustrated embodiment.

The below overview of the sawmill 100 provides background to describe various embodiments of the new systems and methods described herein. Such is not intended to be in any way limiting, and the new systems and methods described herein may be practiced in other configurations of sawmills.

The sawmill 100 includes a variety of machines to process logs into the final sawn lumber product. It is recognized that other sawmills may include additional machines, may omit one or more of the illustrated machines, and/or may process logs into sawn lumber in a different manner.

The sawmill 100 may, for example, include one or more log sort decks 110 where bucked logs are sorted, for example by size or length. The sawmill 100 may include one or more primary breakdown machines 112 that may include one or more chip heads and one or more saws for cutting logs into cants and sideboards.

The sawmill 100 may include one or more gangsaws 114. The gangsaw(s) 114 may include one or more gangs or arbors of circular blades that cut a cant into individual boards of sawn lumber. The gangsaw 114 may, for example take the form of a double arbor gangsaw which includes a lower arbor that saws into a cant from the bottom and an upper arbor which saws into the cant from the top. A double arbor gangsaw can accommodate cants of a larger variety of widths than might otherwise be possible with a single arbor gangsaw. The gangsaw 114 may take the form of a curve sawing gangsaw, which saws a curved path through the cant in an effort to maximize the value of sawn lumber produced from each cant. The curved path is customized to or defined specifically for each cant.

The sawmill 100 may include one or more edgers 118 which edge irregular edges to produce sawn lumber with two pairs of essentially parallel sides. The edger(s) 118 may reduce a width of the board to remove imperfections that would otherwise reduce the value of the resulting board of sawn lumber. The edger(s) 118 may have more than two saws, and can produce one or more pieces from each sideboard.

The sawmill 100 may include one or more trimmers 120 which cut the sawn lumber to length. The trimmer(s) 120 reduces the length of a board to remove imperfections that would otherwise reduce the value of the resulting sawn lumber. The edger(s) 118 and trimmer(s) 120 are operated based on a variety of rules related to grading, for example rules that set out acceptable amounts of imperfection.

Boards from the edger 118 continue directly to the trimmer 120. Many of the boards from the gangsaw 114 can go directly to the trimmer 120, but pieces with defects can be sent to the edger 118.

If the trimmer 120 detects a defect in a sawn board that can be corrected by edging, it can be diverted to the edger 118 for further processing. Boards that are not diverted to the edger 118 flow to the sorter system 122.

As illustrated, the system 102 for monitoring sawmill performance includes a plurality of scan zones, including a gang scan zone 104, an edger infeed scan zone 106, and an edger outfeed scan zone 108. Each of these scan zones may be coupled to a central computing device 124, which forms part of the sawmill audit system 102. Although the sawmill audit system 102 includes three scan zones, other systems for monitoring sawmill performance may include more or fewer scan zones, and the scan zones may be in different locations and differently configured. For example, in one embodiment, any one of the illustrated scan zones may be the only scan zone used in the system for auditing performance. In addition, in one embodiment, each of the scan zones may be independent of the scanning systems of the sawmill 100 used for lumber positioning and optimization. However, in other embodiments, these scanning systems may be integrated.

In one embodiment, each scan zone includes one or more laser scanners positioned to scan a number of pieces of lumber. In other embodiments, the scan zones may incorporate other imaging systems in order to generate images of the pieces of lumber. As used herein, lumber is a broad term, referring to any piece of wood, including, for example, uncut, undebarked logs, partially processed logs, log segments, cants, sideboards, flitches, edging strips, boards, finished lumber, etc. The term, log, unless apparent from its context, is also used in a broad sense and may refer to, inter alia, uncut, undebarked logs, partially processed logs or log segments.

The computing device 124 may be communicatively coupled to the scan zones and receive image data and/or other sensor data therefrom in order to determine at least one geometric characteristic for each piece of lumber. The computing device 124 may then logically associate a particular piece of lumber with at least one of a log or a cant from which the piece of lumber was sawn. Based on the image data received from the different scan zones, as will be described in greater detail below, a variety of acts may be performed by the computing device 124 in order to perform this logical association.

Figure 2:
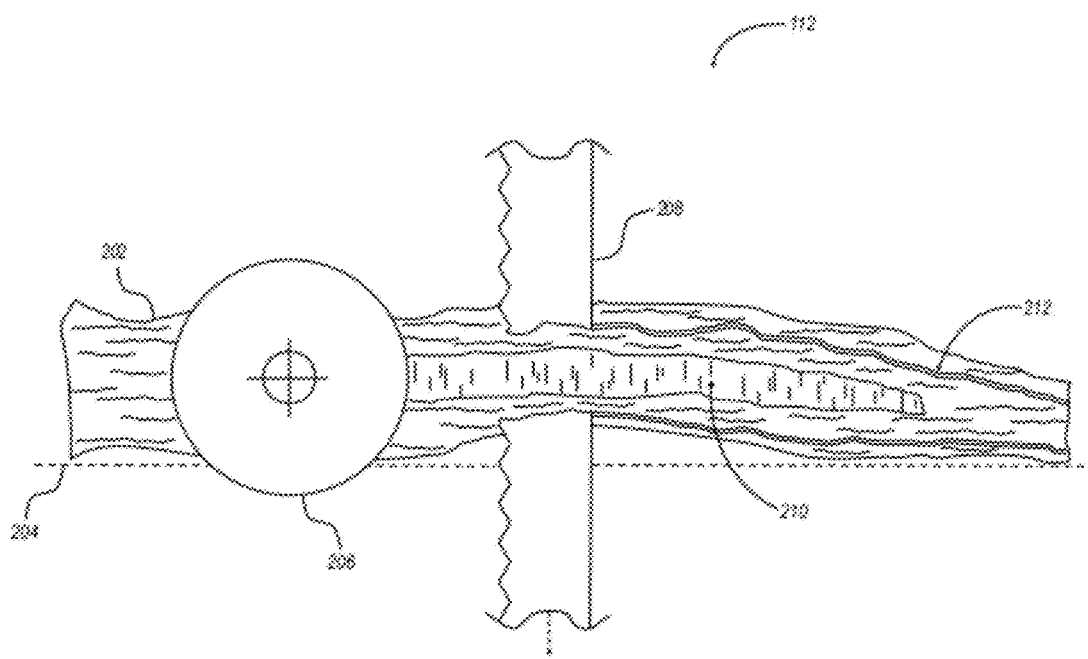
FIG. 2 is a side elevation view of the primary breakdown machine illustrating chipping and sawing operations being performed on a log segment.

FIG. 2 is a side view of a primary breakdown machine center 112. The log 202 is being transported past a chip head 206 that produces a flat surface 210 on the outside of the log 202. Downstream of the chip head 206 is a bandsaw 208 that cuts a sideboard 212 away from the log. FIG. 2 illustrates a log that has sweep or curvature due to the natural growth characteristics of the tree from which it was cut. In the primary breakdown machine it is customary to orient the sweep in a vertical plane such that the ends of the log 202 are in contact with the transport chain 204. This improves log stability and allows a downstream curve sawing gangsaw 114 to extract more lumber from the log. This placement or orientation is commonly referred to in the industry as being "horns down."

Figure 3:
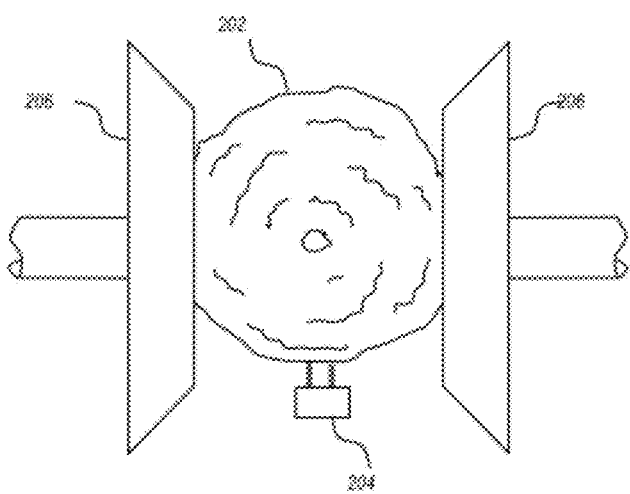
FIG. 3 is a front view elevation of the chipping operation of the primary breakdown machine of FIG. 2 being performed on the log segment.

FIG. 3 is an end view of the chipping process that further illustrates the sharp chain 204 carrying the log 202 through a pair of chip heads 206. These chip heads are controlled by the primary breakdown optimizer to create what will be the faces of the outside sideboards.

Figure 4:
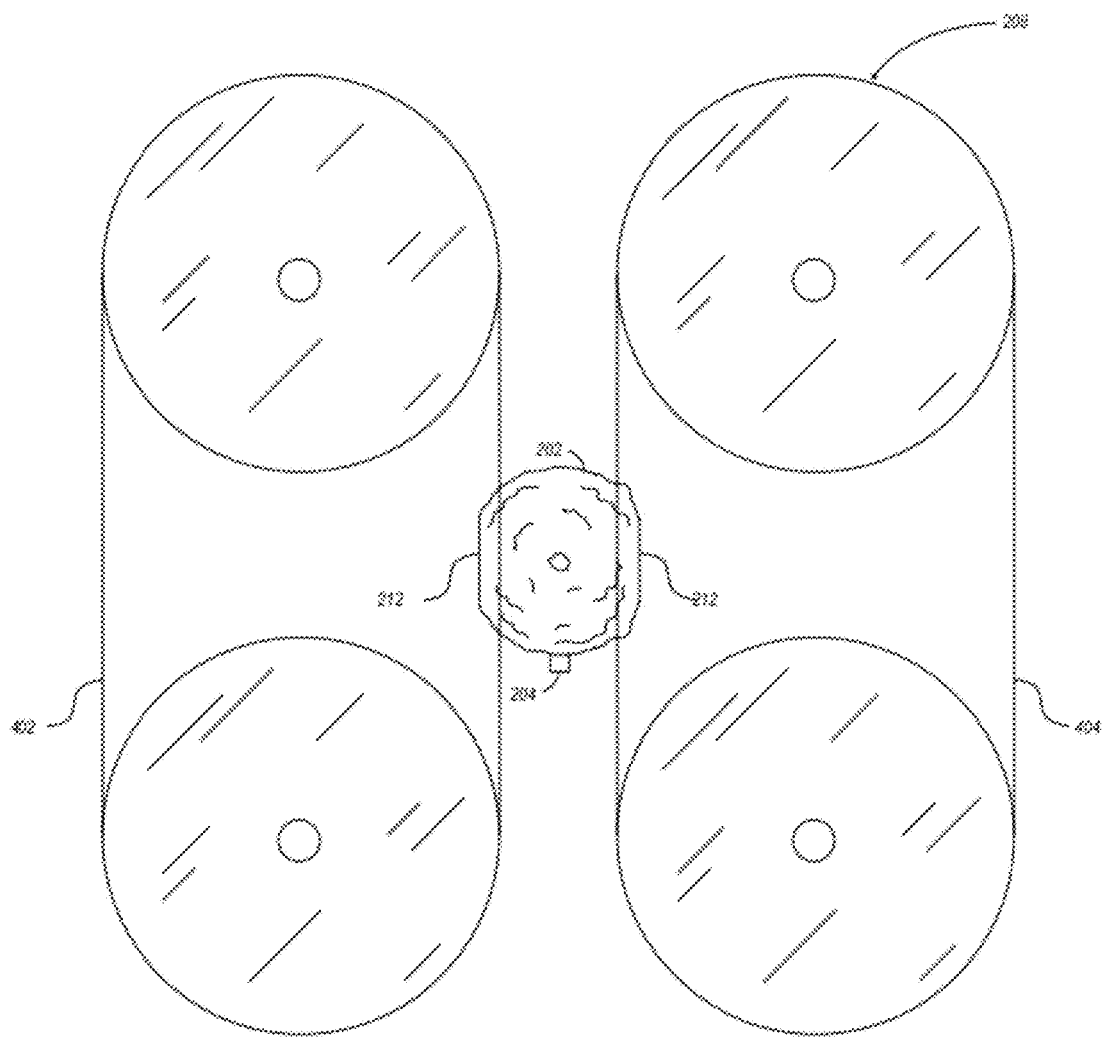
FIG. 4 is a front elevation view of the bandsaw section of the primary breakdown machine of FIG. 2 sawing sideboards from a log segment to create a cant.

The primary breakdown machine center 112 may include one or more bandsaws as shown in FIG. 4. The left bandsaw 402 produces a left sideboard 212 while the right bandsaw 404 produces a right sideboard 212. Sawmills that process large logs may have two additional bandsaws (not shown) that, together with the chip heads are referred to as a canter quad machine. Such a machine can produce up to four sideboards 212 from one log.

Figure 5:
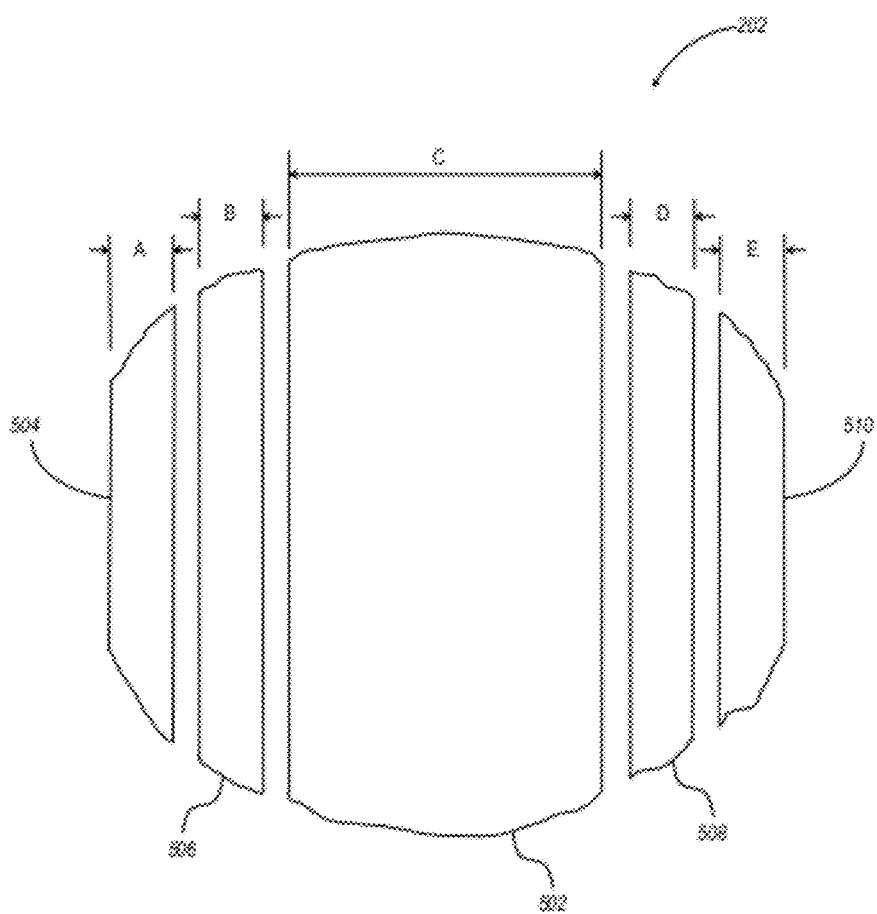
FIG. 5 is a cross section view of an exemplary log segment after processed by the primary breakdown machine into a cant and four sideboards.

The pieces cut from the log 202 using a canter quad are illustrated in FIG. 5 and include the left outer sideboard 504, left inner sideboard 506, a center cant 502, right inner sideboard 508, and right outer sideboard 510. The sideboards are usually transported to the edger 118 for further processing into sawn boards, while the cant is transported to the gangsaw 114 for further processing into sawn boards.

As shown in FIG. 5, the dimensions A, B, C, D and E are created by the primary breakdown machine. One of the purposes of the sawmill audit system 102 is to monitor and manage the accuracy of the primary breakdown machinery.

Figure 6:
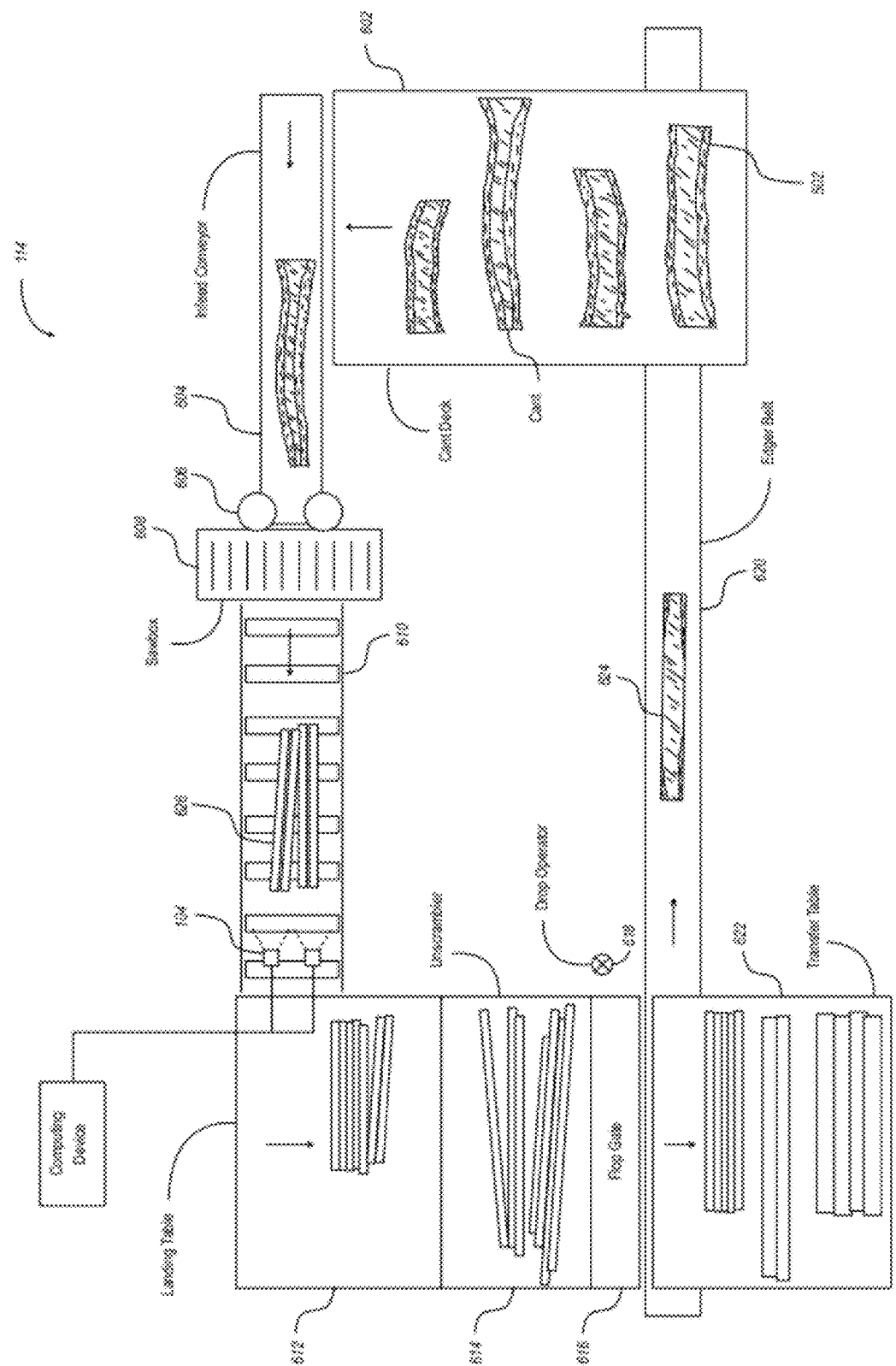
FIG. 6 is an overhead schematic view of an example environment for a system for monitoring boards that have been sawn by a gangsaw according to one illustrated embodiment.

After processing at the primary breakdown machine 112, the cants 502 may be transported for further processing at a gangsaw 114, as illustrated in FIG. 6. In other embodiments, other machines may be used to further break down the cants 502. For example, a series of bandsaws, commonly known as "resaws" may be used. Such resaws may saw one or more boards at a time from the cants 502.

The gangsaw 114 may also have any of a number of configurations. For example, the gangsaw 114 may be either a single arbor or a double arbor gangsaw having a number of parallel, circular saw blades located at precise intervals within a sawbox 608. The gangsaw 114 may also include more saw blades than are used to saw each arriving cant 502, and the gangsaw 114 may be controlled to distribute the sawing workload among the saw blades to ensure that certain blades are not over-utilized while others are under-utilized. At or proximate a gang saw infeed 606 located in the front of the sawbox 608, the gangsaw 114 may further include chip heads 606, such as vertical drum chip heads, that remove excess wood from the outside of each cant 502.

Although not illustrated, in one embodiment, the cants 502 may be scanned either transversely or lineally before they arrive at the gangsaw 114. This scanning may be used to derive information regarding the geometry of the cants 502, and a gangsaw computer optimizer may use this information to determine an optimal way to saw each cant 502 into a plurality of boards. Based on the determined optimal sawing process, the gangsaw computer optimizer may send appropriate commands to a programmable logic controller (PLC) that then directly controls the gangsaw 114 during sawing.

Figure 7:
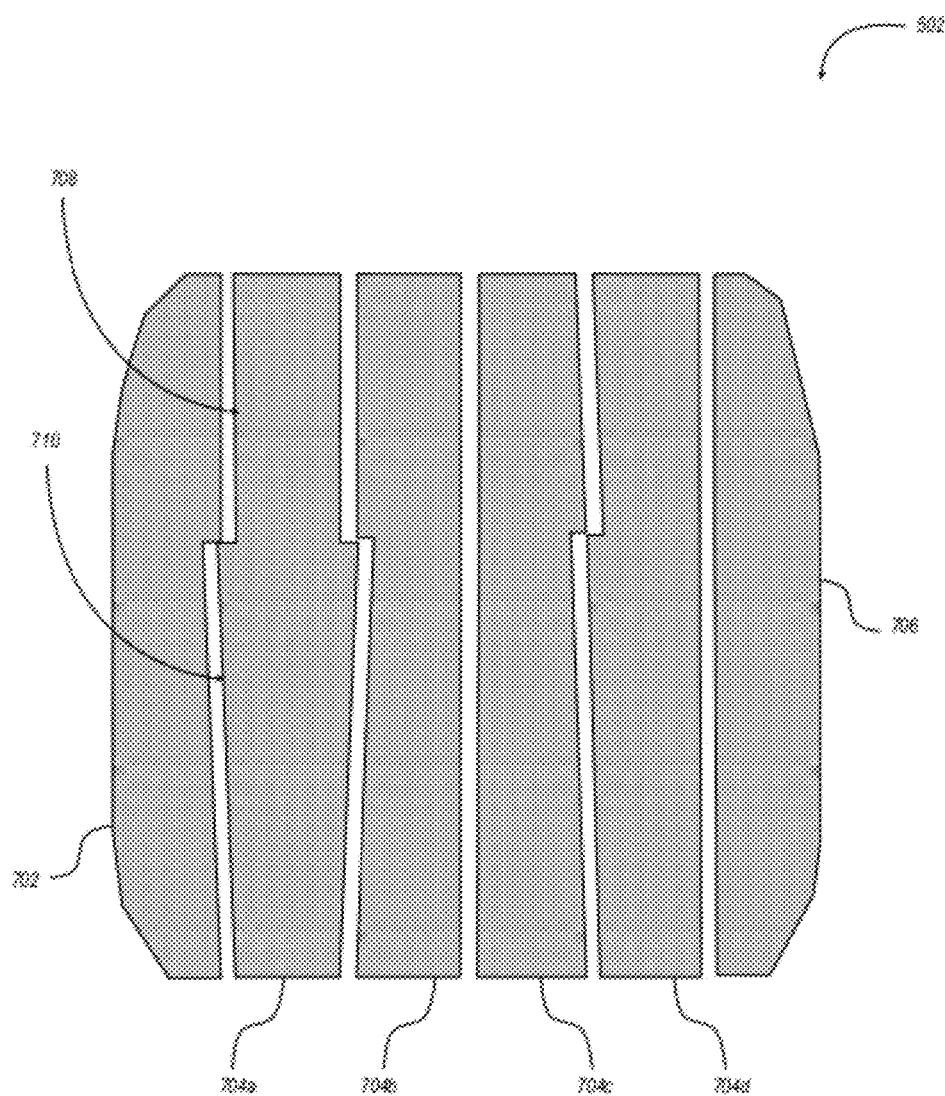
FIG. 7 is a cross sectional view of the sawn cant showing mismatch as a result of saw blades of a double arbor gangsaw being out of alignment.

FIG. 7 shows the lumber that may be sawn from a cant 502 using a double arbor gangsaw. The top surfaces 708 have been created by a plurality of top circular saw blades mounted on a top arbor, while the bottom surfaces 710 are created by a plurality of bottom circular saw blades mounted on a bottom arbor. As shown in FIG. 7, these two sets of saws may not always meet, creating a shape defect commonly referred to as "mismatch". The left board 702 and the right board 706 may contain too much wane, causing them to be sent to the edger 118 to be sawn into narrower boards. The inner boards 704 will be sent directly to the trimmer 120.

As illustrated in FIG. 6, after the cant 502 has been completely sawn by the sawbox 608, the boards 626 may emerge from the gangsaw, fall apart, and be transported for some distance lineally along a rollcase 610. The rollcase may include key stock welded to the rolls in order to bounce the boards 626 up and down in order to remove most of the sawdust. The bouncing may also tend to flatten the boards 626 out as it separates the boards 626. When the boards 626 emerge from the sawbox 608, they may be arranged near each other and in the same order in which they were sawn by the gangsaw 114 (i.e., the third board from the left on the rollcase 610 was also the third board from the left during the sawing process).

Figure 8:
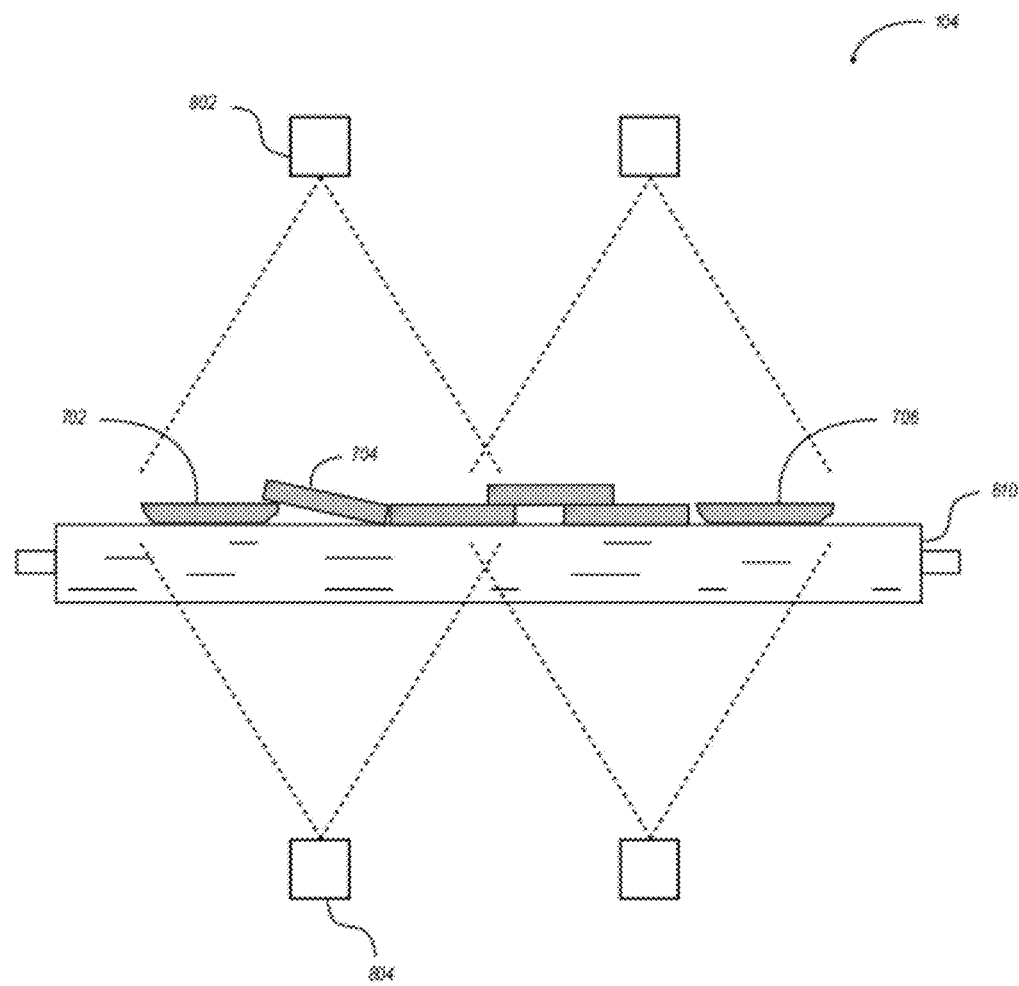
FIG. 8 is a front elevation view of a plurality of planar laser scanners arranged lineally to scan boards sawn by a gangsaw, according to one illustrated embodiment.

In one embodiment, as illustrated in FIG. 8, the left board 702, right board 706 and middle boards 704 may be measured geometrically by a scan zone 104 consisting of four planar laser scanners 802 positioned to scan the boards 626 lineally as they are transported on the outfeed rollcase 610.

Different arrangements of laser scanners may also be used to determine geometric characteristics of the boards 702 through 706. The laser scanners may also be positioned at still other locations downstream from the gangsaw 114. In other embodiments, different imaging systems may also be used. The light source may comprise another collimated non-laser light source, or another more diffuse source of electromagnetic radiation. The image generator may also be modified in alternative embodiments.

In one embodiment, the computing device 124 may process image or scan data from any of the example gangsaw scan zones 104 described above in order to determine at least one geometric characteristic of each board 626. For example, in one embodiment, the computing device 124 may determine a thickness along at least one edge of each board 626. The computing device 124 may also determine geometric characteristics of the wane and outside faces of the outside boards 702 and 706. In another embodiment, the computing device 124 may determine width and length characteristics for each board 626.

The board width information obtained at this scan zone 104 can be used to monitor and audit measurement C (FIG. 5) in order to determine the sawing accuracy of the primary breakdown machine 112.

The computing device 124 may be further configured to logically associate the boards 626 with at least one of a log 202 from which the boards 626 were sawn. In one embodiment, the computing device 124 may compare geometric characteristics of the boards 626, individually or as a collective, with geometric characteristics of the cants 502 or logs from other scan zones in the lumber tracking system 102. For example, the computing device 124 may compare outer dimensions and/or wane characteristics. The computing device 124 may then logically associate a board 626 with a particular cant 502 or log 202 when corresponding geometric characteristics are detected. In another embodiment, the gangsaw scan zone 104 may be the only scan zone in the lumber tracking system 102, and the boards 626 may be associated with a log or a cant based on image data from previous optimization scans. In still another embodiment, the boards 626 may simply be logically associated with the cant 502 from which the boards 626 have just been sawn. In yet another embodiment, the logical association may be based at least in part on an order in which the cants 502 are processed at the gangsaw 114.

Figure 9:
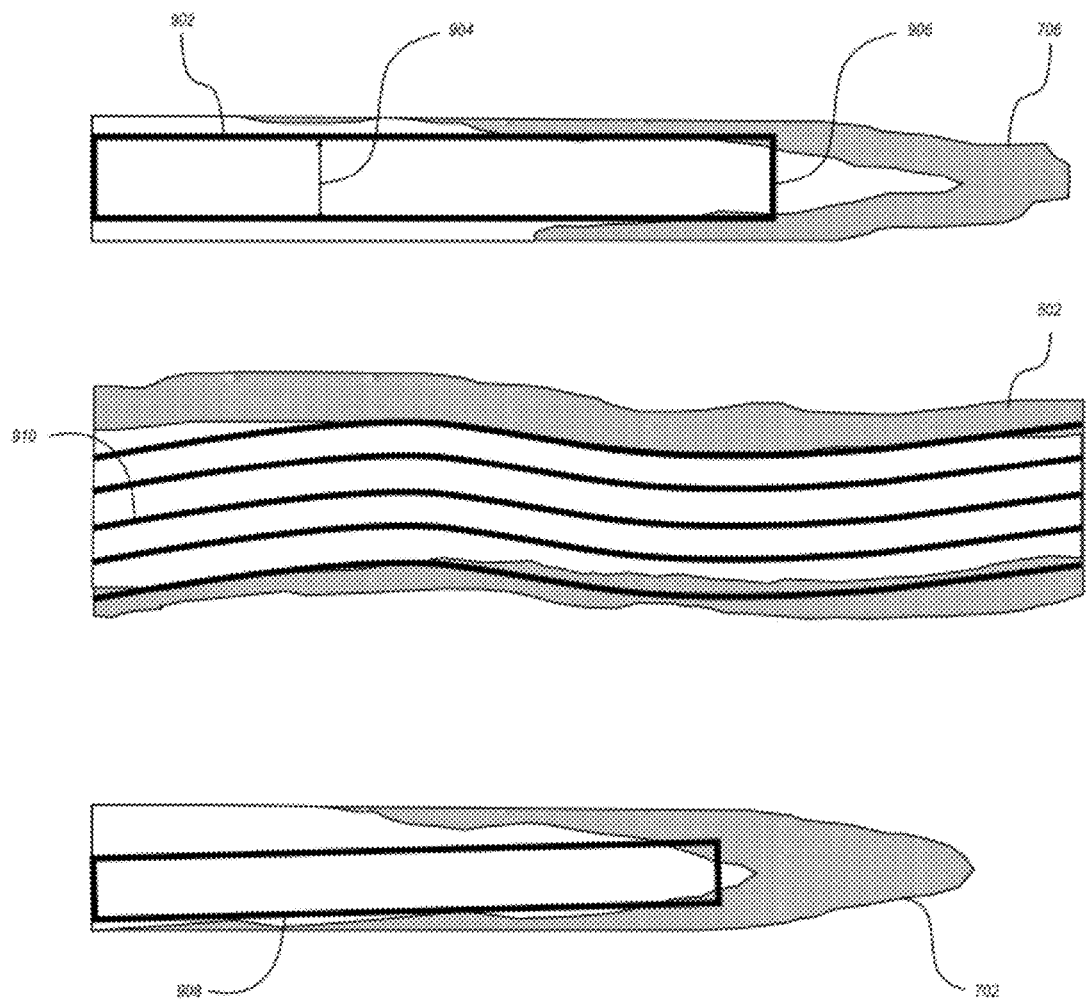
FIG. 9 is a plan view of an exemplary cant sawn by a gangsaw with curve sawing capability, and the left and right sideboards that will be sent to the edger for further processing.

The computing device 124 may also monitor data from the PLC that controls the gangsaw machinery, monitoring the movement of the chip heads 606 and sawbox 608 during curve sawing. FIG. 9 illustrates some of the characteristics that computing device 124 can determine using the data from the PLC and the image or scan data from gangsaw scan zone 104. In this illustration, cant 502 has been processed using curve sawing techniques. The saw path(s) 910 can be determined by monitoring the PLC data. The geometric characteristics of the left board 702 and right board 706 may be extracted from the scan zone 104. Further, the computing device 124 may computationally simulate the edging and trimming process to determine the final width 904 and length 906 of the simulated outside boards 902, 908.

The computing device 124 may also provide feedback information to the sawmill personnel regarding the performance of the gangsaw processing station. For example, if the boards predicted by the gangsaw computer optimizer do not match the scanned boards 626, then mechanical or programming adjustments may need to be made.

Additionally or alternatively, the computing device 124 may perform an independent optimization analysis based at least in part on image data from the gangsaw scan zone 104.

Additionally or alternatively, the computing device 124 may determine a value for the boards 626 emerging from the gangsaw 114. As described above, the computing device 124 may also determine an optimal value corresponding to a log 202 or cant 502 from which the boards 626 have been sawn. The value of the boards 626 may then be compared with the optimal value of the corresponding log or cant in order to determine whether or not the sawmill 100 is realizing the optimal value from each log or cant. Differences between the optimal and realized values may stem from defects at any of the processing stations in the sawmill 100 between receipt of a log at 112 and the outfeed of the gangsaw 114 and/or less than optimum operation of an upstream optimizer.

Returning to FIG. 6, the boards 626 may arrive at a landing table 612 and may be singulated by what is commonly referred to as an "unscrambler" 614 to allow a drop operator (e.g., machine or human) 618 to segregate boards into two types. A board 624 that has too much edge wane can be dropped via the flop gate 616 to an edger belt 620 that transports the piece to the edger 118 for further processing. Boards that do not need edging proceed directly to the trimmer 120 via transfer table 622.

The drop operator 618 decides whether to send boards to the edger or to the trimmer. Consider FIG. 10, in which a board 706 could be sent to the edger to be manufactured into final sawn board 1002 or could be sent to the trimmer to be manufactured into final sawn board 1004 which is shorter but wider than the alternative board 1002. Since these pieces usually arrive at the drop operator station wane down, it is especially difficult to determine which path the board should take. The optimum decision would take into account the relative value of board 1002 versus board 1004, something that can be accomplished using geometric information from scanner 104 and alternative simulations by computing device 124. The computing device 124 may cause an optional marking system (not shown) to place a distinguishable mark on the boards that should be sent to the edger 118.

If the drop operator does not have such a system, mistakes will adversely affect production efficiency. If a board arrives at the edger that only needs to be trimmed, the board will be transported through the edger 118 without being edged. This wastes production capacity at the edger system. If a board arrives at the trimmer 120 that needs to be edged, the board will be diverted back to the edger 118 and thus waste production capacity at the trimmer.

Figure 11:
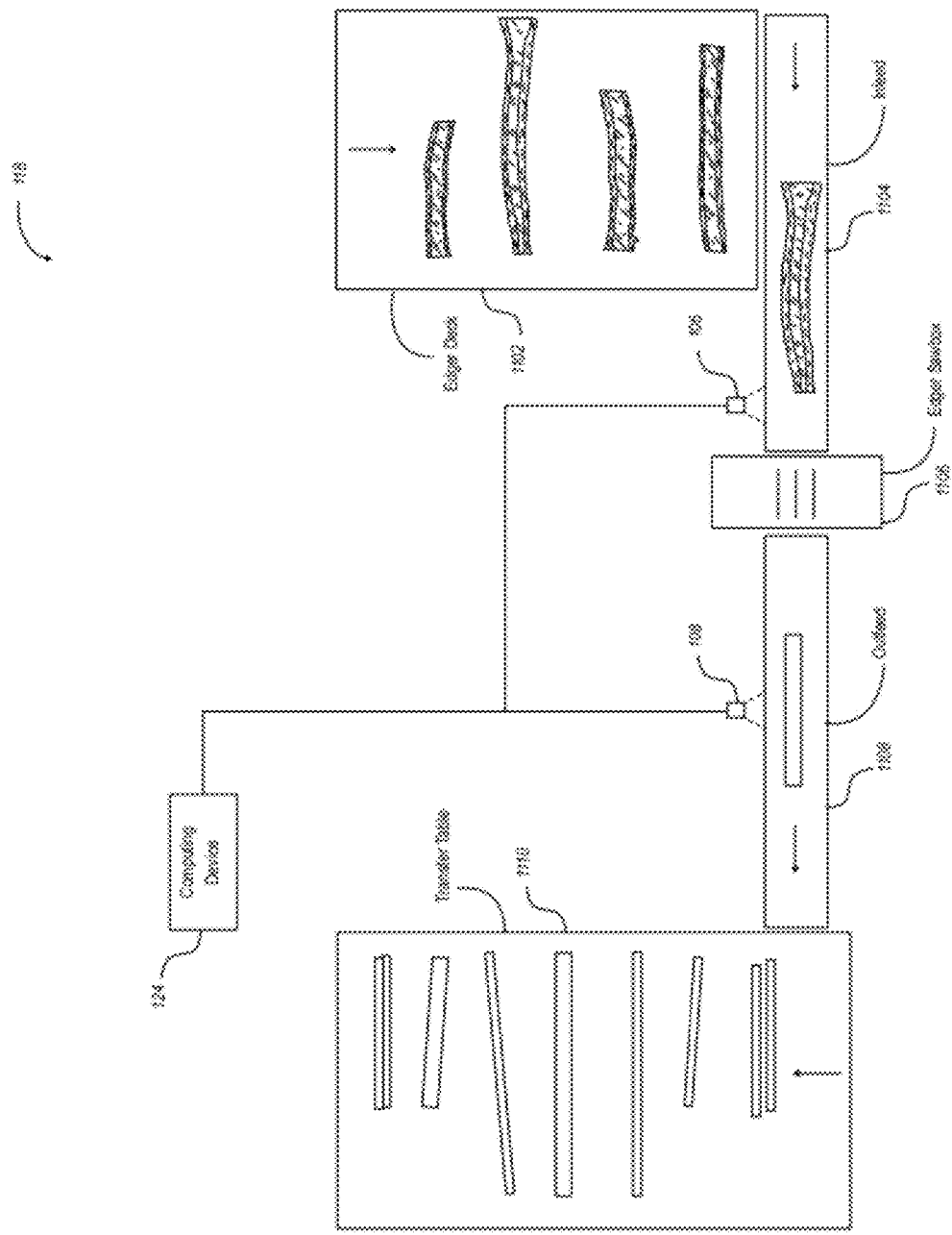
FIG. 11 is an overhead schematic view of an example environment for a system for monitoring pieces that are being processed by an edger, according to one illustrated embodiment.

Returning to FIG. 1, sideboards from the primary breakdown machine 112, boards from the gangsaw 114 and boards from the trimmer 120 may be transported to the edger 118 for further processing. In some implementations, scan zone 106 at the edger infeed and scan zone 108 at the edger outfeed may send geometric information to computing device 124 as part of sawmill auditing system 102. FIG. 11 shows the edger machine center in more detail. The edger 118 may be associated with a scanning and optimization system (not shown) that controls one or more movable chip heads and/or saws for sawing along the length of each board.

Figure 12:
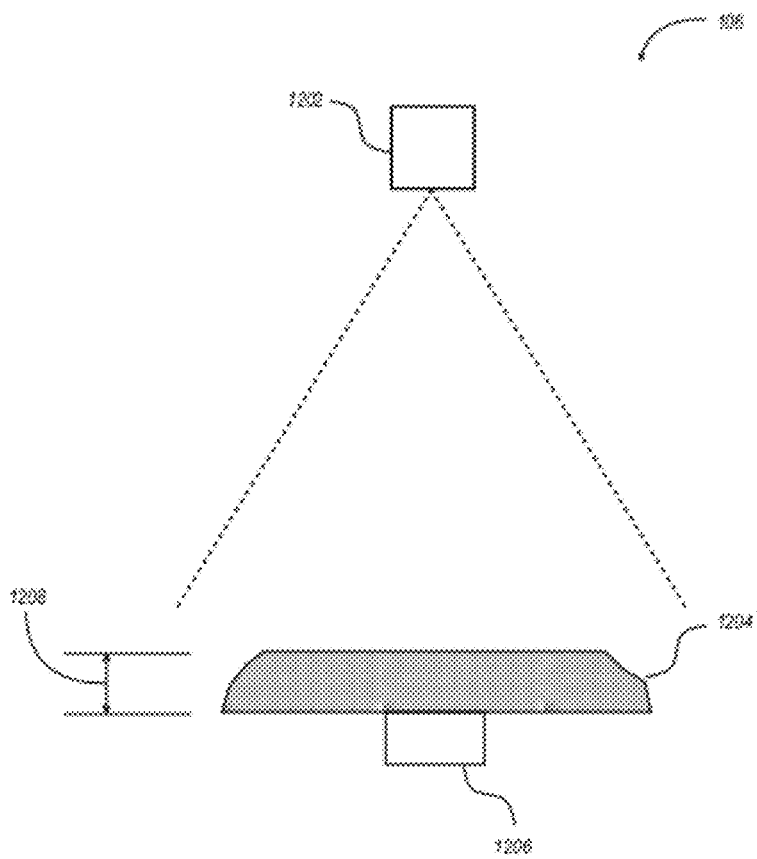
FIG. 12 is a front elevation view of an edger infeed scan zone for use in the system of FIG. 1.

FIG. 12 shows scan zone 106 located at the infeed to edger 118. The edger infeed scan zone 106 may include a top mounted planar laser 1202 that images the board 1204 as it travels lineally on conveyor 1206. The board 1204 may be wane down or wane up (as shown). Because the board 1204 is held tightly to the conveyor 1206 by overhead rolls (not shown) it is practical to measure the thickness 1208 down the length of the board using only data from the overhead laser 1202. At the same time, the laser 1202 can see the overall shape of each board 1204 that is being processed.

Figure 13:
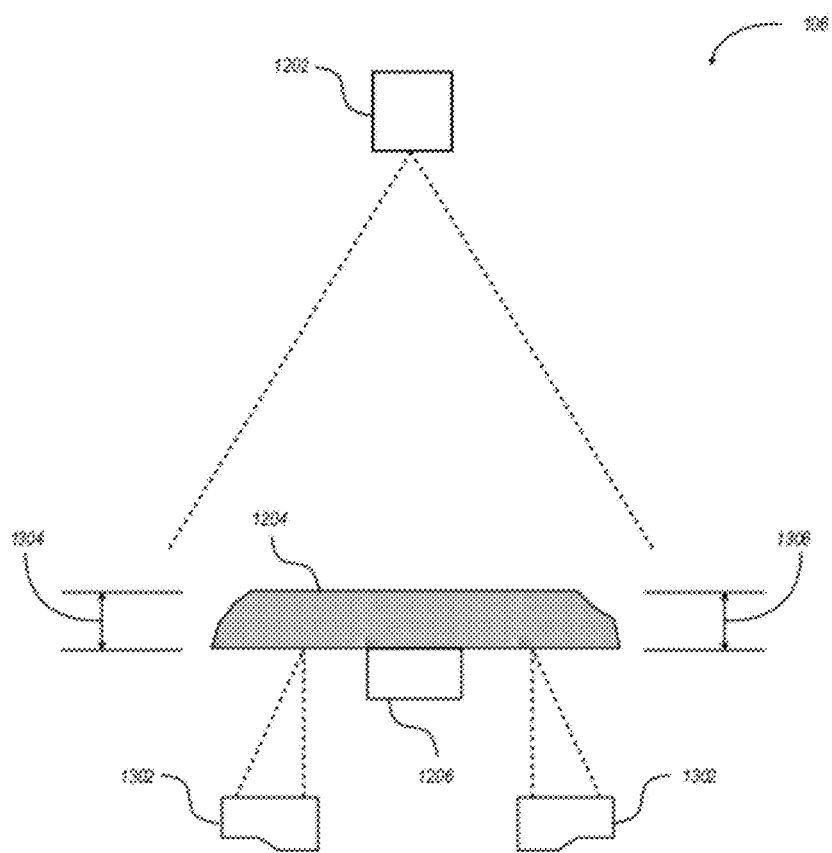
FIG. 13 is a front elevation view of an alternative edger infeed scan zone for use in the system of FIG. 1.

FIG. 13 is an alternative embodiment of edger infeed scan zone 106 that employs a top planar laser 1202 and two single point lasers 1302 under the board. This captures image or scan data which allows the computing device 124 to determine what is commonly called "wedging." An example of wedging is the difference between thickness 1304 on the left of the board 1204 and 1306 on the right of the board 1204.

Figure 14:
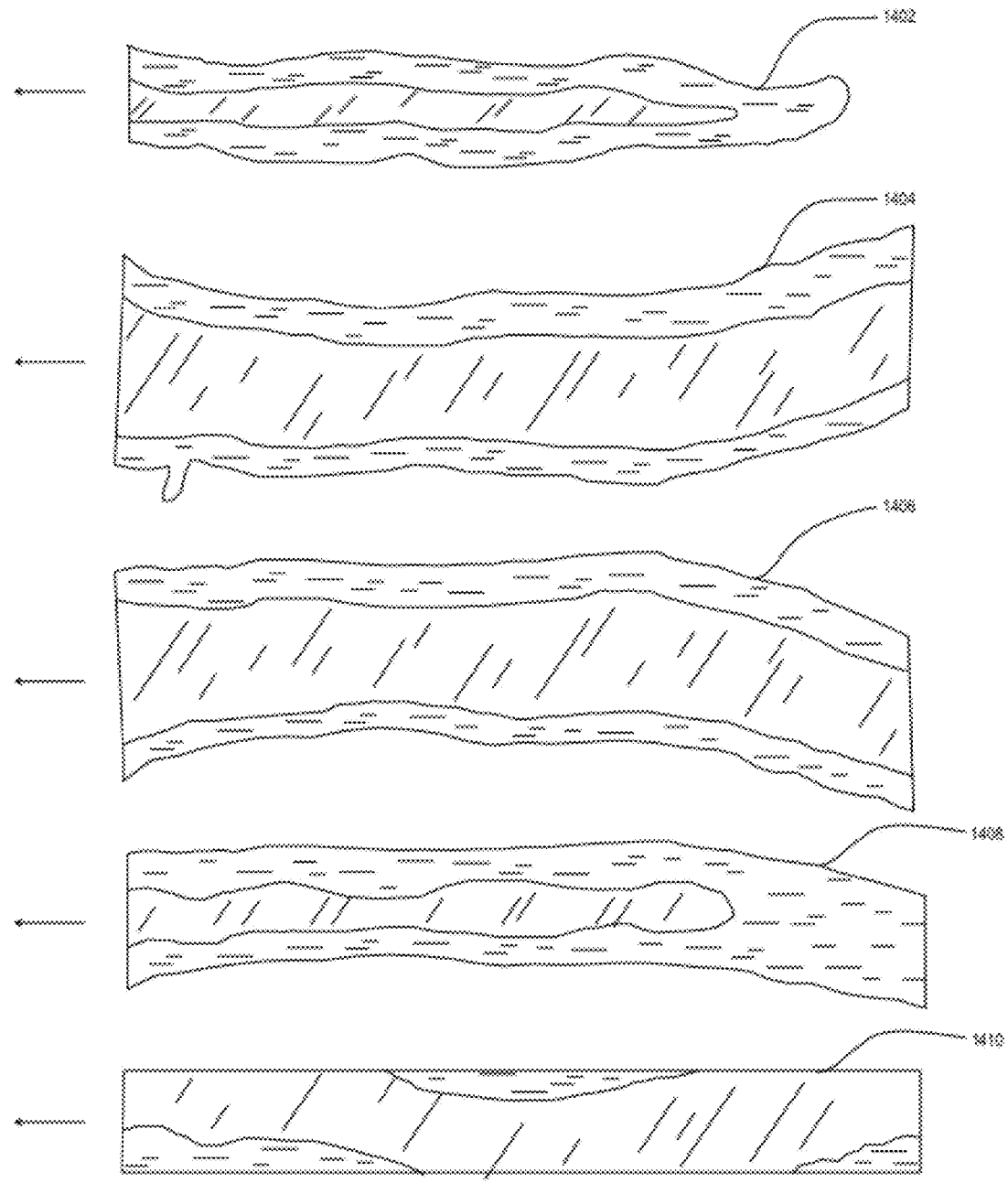
FIG. 14 is a plan view of exemplary pieces being processed by the edger machine center of FIG. 1.

The overall shape of each board 1204 processed by the edger 118 will enable the audit system to determine where each piece originated. FIG. 14 illustrates several kinds of boards that may be imaged by the edger infeed scan zone 106 and analyzed by the computing device 124. By assuming that logs are processed with their sweep in the "horns down" position as shown in FIG. 2, the computing device 124 can assign a likely source (e.g., saw, chipper) which generated or produced each board type. Using this method, piece 1402 is likely a right outside sideboard produced by a right side chipper and right side saw of the primary breakdown machine. Piece 1404 is likely a right inner sideboard produced by the right side saw of the primary breakdown machine or gangsaw. Piece 1406 is likely a left inner sideboard produced by left side saws of the primary breakdown machine or gangsaw. Piece 1408 is likely a left outer sideboard produced by a left side outer saw and left side chipper of the primary breakdown machine. Because piece 1410 has some straight outer edges, it is likely a piece from either the gangsaw or trimmer.

By combining the board thickness data with the board shape information from edger infeed scan zone 106, the audit system 102 can determine the trend for dimensions A, B, D and E (FIG. 5). If these dimensions stray from targeted values, the audit system can trigger alarms or take other corrective action.

Figure 15:
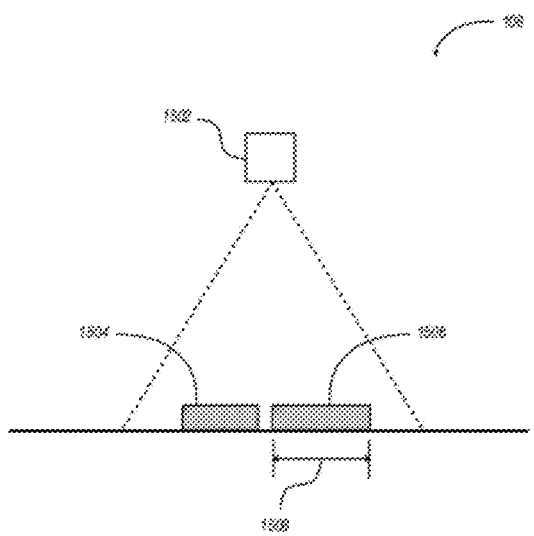
FIG. 15 is a front elevation view of an edger outfeed scan zone for use in the system of FIG. 1.
Figure 16:
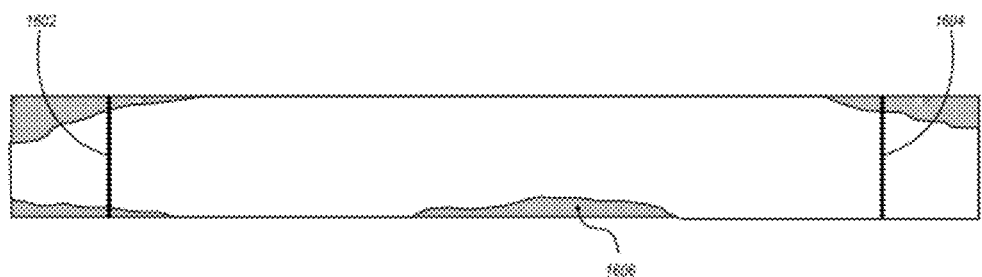
FIG. 16 is a plan view of an exemplary piece that has been analyzed by the edger outfeed scanning system of FIG. 15 to simulate the trimmer operation.

FIG. 15 shows the edger outfeed scan zone 108 of FIG. 1 in more detail. The edger outfeed scan zone 108 may, for example, include one or more planar laser scanners 1502 that measure the geometric characteristics of one or more boards that have been edged. As illustrated in FIG. 15, board 1504 and 1506 have been cut from the same original piece. The edger outfeed scan zone 108 has the ability to measure the width 1508 of each board down the length, to enable the computing device 124 to audit the sawing accuracy of the edger 118. Additionally, computing device 124 may use information from the edger outfeed scan zone 108 to computationally simulate the expected result at the trimmer 120 to determine the value and volume of the resulting simulated board. FIG. 16 shows one such simulated board with front end trim at 1602, trailing end trim at 1604, and allowable wane 1606.

Using data from both edger infeed scan zone 106 and edger outfeed scan zone 108, the computing device 124 may computationally simulate by at least one processor a plurality of simulated edging solutions, each of at least some of the simulated edging solutions different from an actual edging decision, and computationally determine by at least one processor a simulated amount of recovery from the board for each of at least some of the simulated edging solutions.

Figure 17:
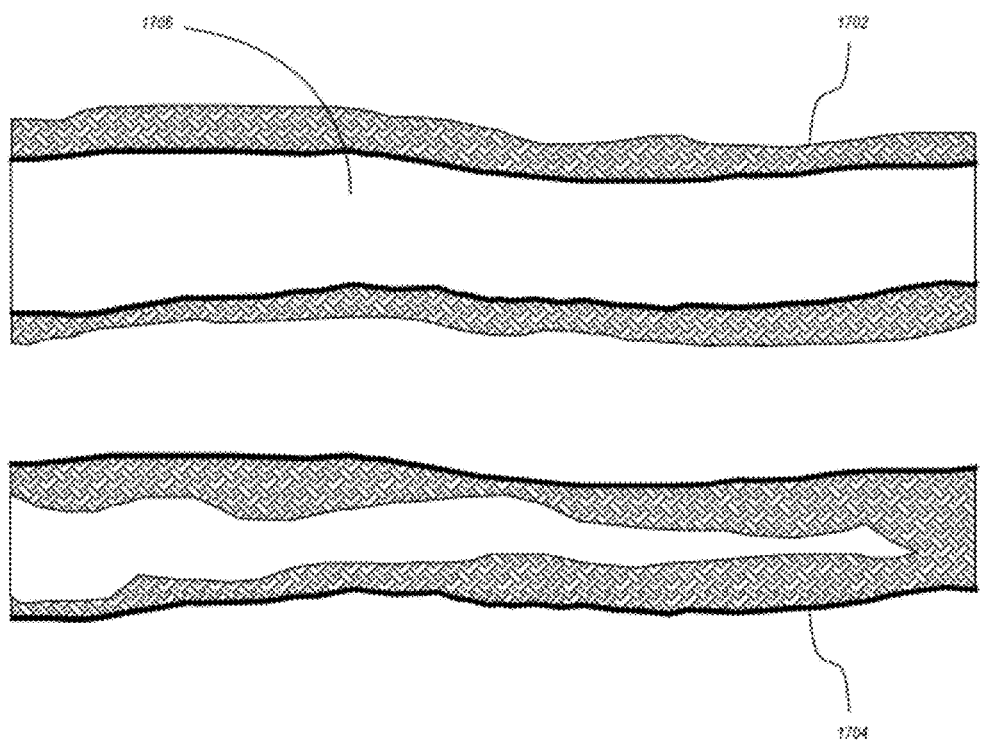
FIG. 17 is a side elevation view of an exemplary cant and sideboard of FIG. 2.
Figure 10:
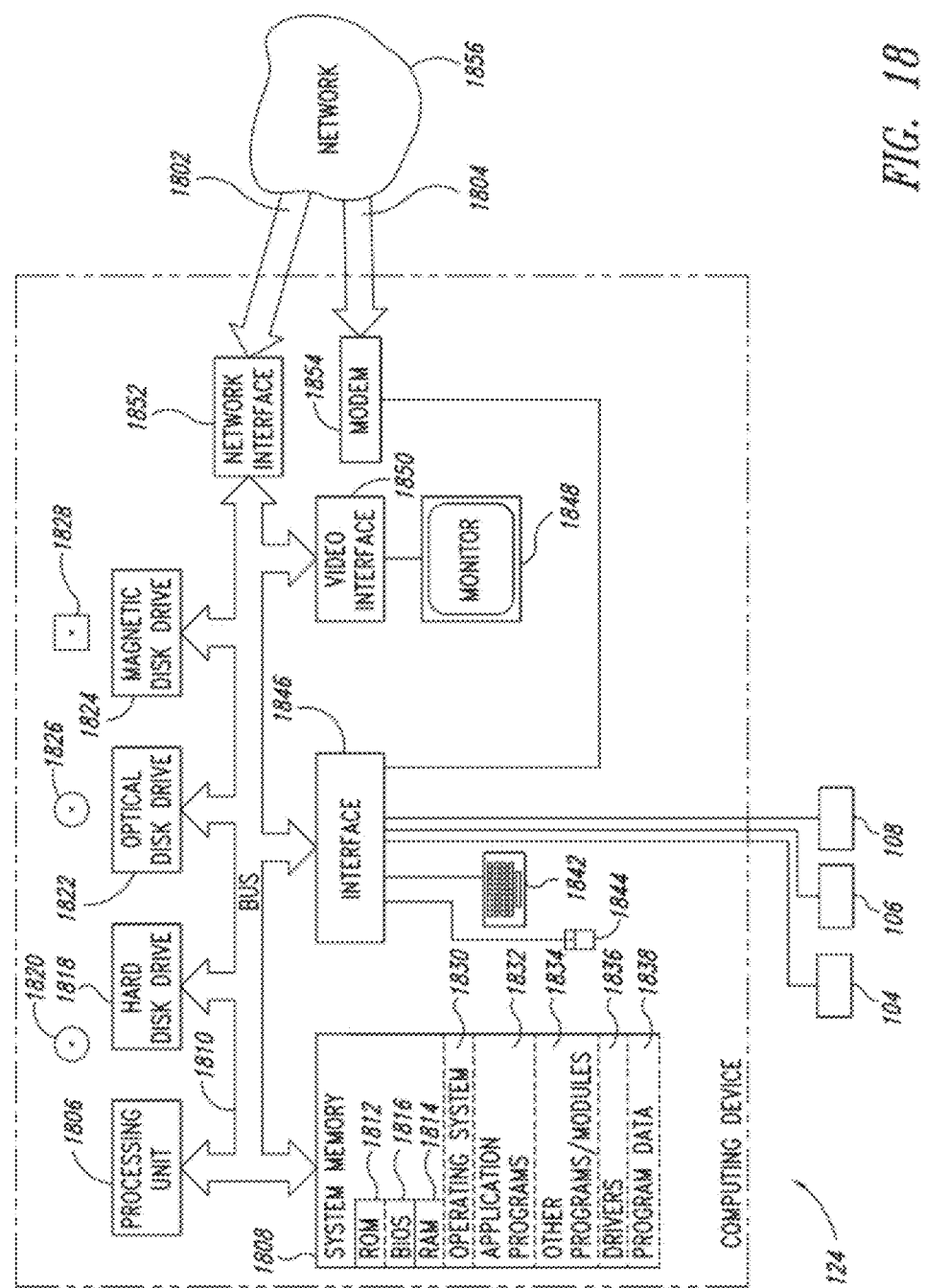

Using data from gangsaw scan zone 104, edger infeed scan zone 106 and edger outfeed scan zone 108, the computing device 124 can compare cant shapes with sideboard shapes to determine the total value and volume of lumber from each log. FIG. 17 illustrates a cant 1702 with a face 1706 that matches the shape of a sideboard 1704 that came from the given log. By associating sideboards with cants, the audit system can monitor overall sawmill efficiency.

FIG. 18 is a schematic diagram of a computing device 124 for use with the lumber tracking system 102 of FIG. 1, according to one illustrated embodiment. Although not required, the embodiments will be described in the general context of computer-executable instructions, such as program application modules, objects, or macros being executed by a computer. Those skilled in the relevant art will appreciate that the illustrated embodiments as well as other embodiments can be practiced with other computer system configurations, including handheld devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

FIG. 18 shows the computing device 124 coupled by one or more communications channels/logical connections 1802, 1804 to a network 1856. However, in other embodiments, the computing device 124 need not be coupled to a network.

The computing device 124 may take the form of a conventional PC, which includes a processing unit 1806, a system memory 1808 and a system bus 1810 that couples various system components including the system memory 1808 to the processing unit 1806. The computing device 124 will at times be referred to in the singular herein, but this is not intended to limit the embodiments to a single computing system, since in certain embodiments, there will be more than one computer system involved. Non-limiting examples of commercially available computing devices include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 1806 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 18 are of conventional design. As a result, such blocks need not be described in further detail herein, as they will be understood by those skilled in the relevant art.

The system bus 1810 can employ any known bus structures or architectures, including a memory bus with memory controller, a peripheral bus, and a local bus. The system memory 1808 includes read-only memory ("ROM") 1812 and random access memory ("RAM") 1814. A basic input/output system ("BIOS") 1816, which can form part of the ROM 1812, contains basic routines that help transfer information between elements within the computing device 124, such as during start-up.

The computing device 124 also includes a hard disk drive 1818 for reading from and writing to a hard disk 1820, and an optical disk drive 1822 and a magnetic disk drive 1824 for reading from and writing to removable optical disks 1826 and magnetic disks 1828, respectively. The optical disk 1826 can be a CD or a DVD, while the magnetic disk 1828 can be a magnetic floppy disk or diskette. The hard disk drive 1818, optical disk drive 1822 and magnetic disk drive 1824 communicate with the processing unit 1806 via the system bus 1810. The hard disk drive 1818, optical disk drive 1822 and magnetic disk drive 1824 may include interfaces or controllers (not shown) coupled between such drives and the system bus 1810, as is known by those skilled in the relevant art. The drives 1818, 1822, 1824, and their associated computer-readable media 1820, 1826, 1828, provide nonvolatile storage of computer-readable instructions, data structures, program modules and other data for the computing device 124. Although the depicted computing device 124 employs hard disk 1820, optical disk 1826 and magnetic disk 1828, those skilled in the relevant art will appreciate that other types of computer-readable media that can store data accessible by a computer may be employed, such as magnetic cassettes, flash memory cards, Bernoulli cartridges, RAMs, ROMs, smart cards, etc.

Program modules can be stored in the system memory 1808, such as an operating system 1830, one or more application programs 1832, other programs or modules 1834, drivers 1836 and program data 1838. While shown in FIG. 18 as being stored in the system memory 1808, the operating system 1830, application programs 1832, other programs/modules 1834, drivers 1836 and program data 1838 can be stored on the hard disk 1820 of the hard disk drive 1818, the optical disk 1826 of the optical disk drive 1822 and/or the magnetic disk 1828 of the magnetic disk drive 1824. A user can enter commands and information into the computing device 124 through input devices such as a touch screen or keyboard 1842 and/or a pointing device such as a mouse 1844. Other input devices can include a microphone, joystick, game pad, tablet, scanner, etc. These and other input devices are connected to the processing unit 1806 through an interface 1846 such as a universal serial bus ("USB") interface that couples to the system bus 1810, although other interfaces such as a parallel port, a game port or a wireless interface or a serial port may be used. A monitor 1848 or other display device is coupled to the system bus 1810 via a video interface 1850, such as a video adapter. Although not shown, the computing device 124 can include other output devices, such as speakers, printers, etc.

The computing device 124 may operate in a networked environment using one or both of the logical connections 1802, 1804 to communicate with one or more remote computers, servers and/or devices through the network 1856. These logical connections may facilitate any known method of permitting computers to communicate, such as through one or more LANs and/or WANs, such as the Internet. Such networking environments are well known in wired and wireless enterprise-wide computer networks, intranets, extranets, and the Internet. Other embodiments include other types of communication networks including telecommunications networks, cellular networks, paging networks, and other mobile networks.

When used in a WAN networking environment, the computing device 124 may include a modem 1854 for establishing communications over the WAN 1804. Alternatively, another device, such as the network interface 1852 (communicatively linked to the system bus 1810), may be used for establishing communications over the WAN 1802. The modem 1854 is shown in FIG. 18 as communicatively linked between the interface 1846 and the WAN 1804. In a networked environment, program modules, application programs, or data, or portions thereof, can be stored in a server computing system (not shown). Those skilled in the relevant art will recognize that the network connections shown in FIG. 18 are only some examples of ways of establishing communications between computers, and other connections may be used, including wirelessly.

As illustrated in FIG. 18, the computing device 124 is further coupled to the scan zones 104, 106, 108. In one embodiment, the scan zones are coupled to the system bus 1810 through the interface 1846 and are thereby communicatively coupled to the computing device 124. The computing device 124 may further include optimizer application programs for receiving data from other scanners (not illustrated), processing that data, and determining optimal sawing processes. In such an embodiment, the computing device 124 may further receive up-to-date market information for lumber via the network 1856. In other embodiments, the computing device 124 may be a separate, auditing computer that may or may not communicate with computer optimizers.

General Discussion of Sawmill Auditing Concepts

In lumber manufacturing the objective is to maximize the profit of the enterprise by maximizing the production volume per unit time, maximize the value of the lumber products, and minimize the cost of the logs which is the raw material being converted into lumber. The sawmill industry has adopted a wide variety of automated, computer controlled technologies to further these objectives. The systems and methods described here help manage these complex mill automation systems through effective auditing of the processes.

One of the most important aspects of lumber manufacturing economics is lumber recovery. This is the measure of total volume and value of lumber extracted from a given volume of raw material. In a typical sawmill about 60% of the log volume is converted into finished lumber. The rest of the log volume is converted into lower value residuals including green chips, sawdust and planer shavings.

Lumber recovery depends on several factors. The first factor is one of target sizes. The finished lumber product must be a specific nominal size in order to meet customer requirements. For example, a standard 2×4 is a finished piece of wood that is exactly 1.5 inches thick and 3.5 inches wide. But in the green sawmill process this piece of wood must be cut thicker and wider than the finished dimensions to account for sawing variation in the mill (averaging plus or minus 0.030 inches), shrinkage (typically 3%) and planer allowance (typically 0.040 inches per side). Thus a green sawmill target size might be as high as 1.750 inches in a sawmill with relatively poor control, and 1.650 inches or smaller in a mill with very good control. The difference in volumetric recovery between these two extremes is huge. For a typical sawmill a green target size reduction of 0.015 inches will result in a lumber recovery improvement of about 1 percent.

Another factor that impacts total fiber usage in sawmills is the amount of material lost to sawdust, known as saw kerf. A typical saw kerf in a sawmill might be 0.150 inches for a primary breakdown bandsaw and 0.120 inches for a circular saw in a gang. Generally speaking if the saw is thicker it will create less variation in the green lumber thickness and can also be used at higher sawing speeds. Conversely if the sawmill is willing to use slower processing speeds, the saw blades can be thinner and the size variation in the sawn lumber will be lower.

Process Flow

Figure 20:
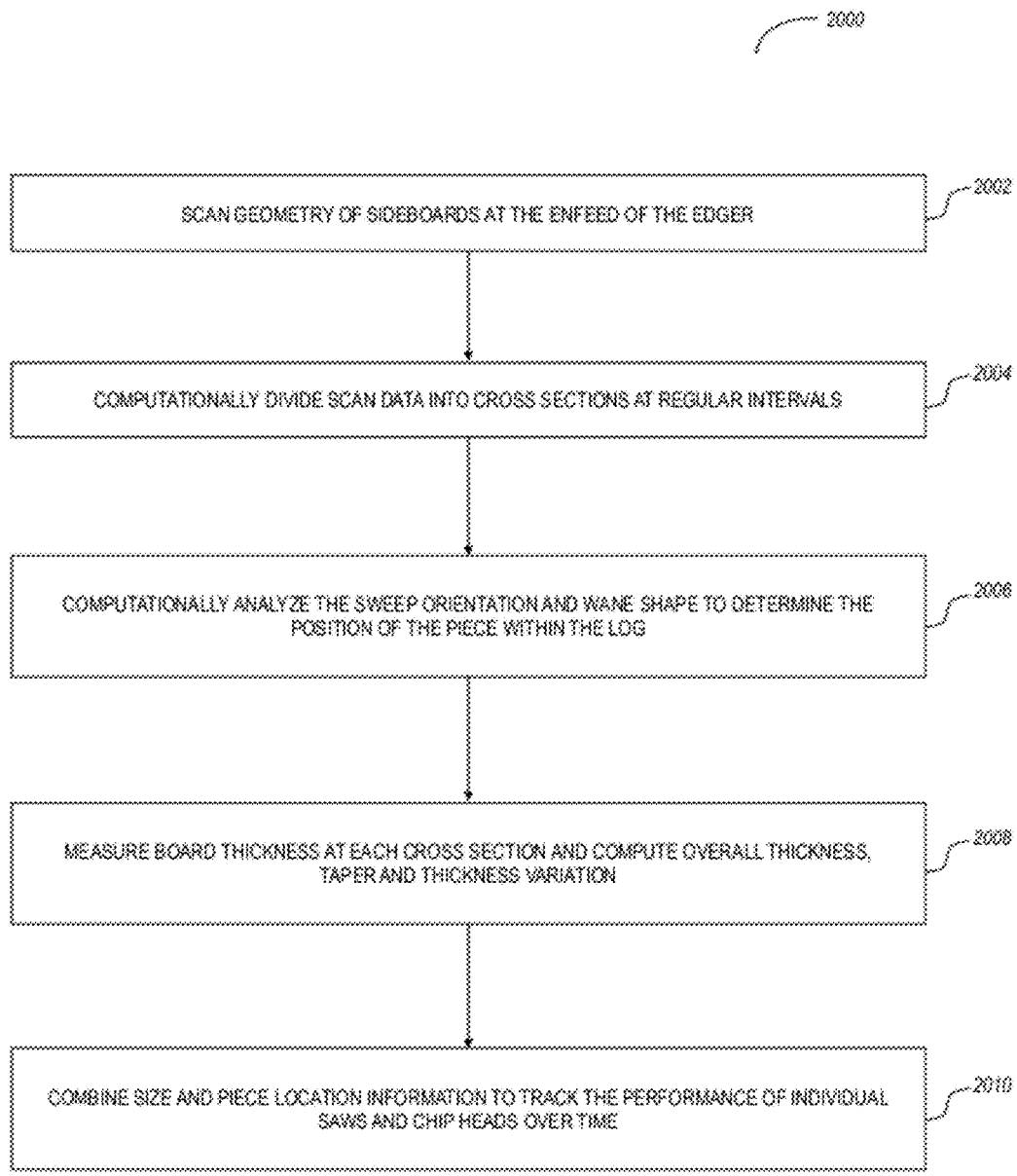
FIG. 20 is a flow diagram of a method of auditing sawmill performance and controlling the same relative to an edger infeed scan zone, according to one illustrated embodiment.
Figure 21:
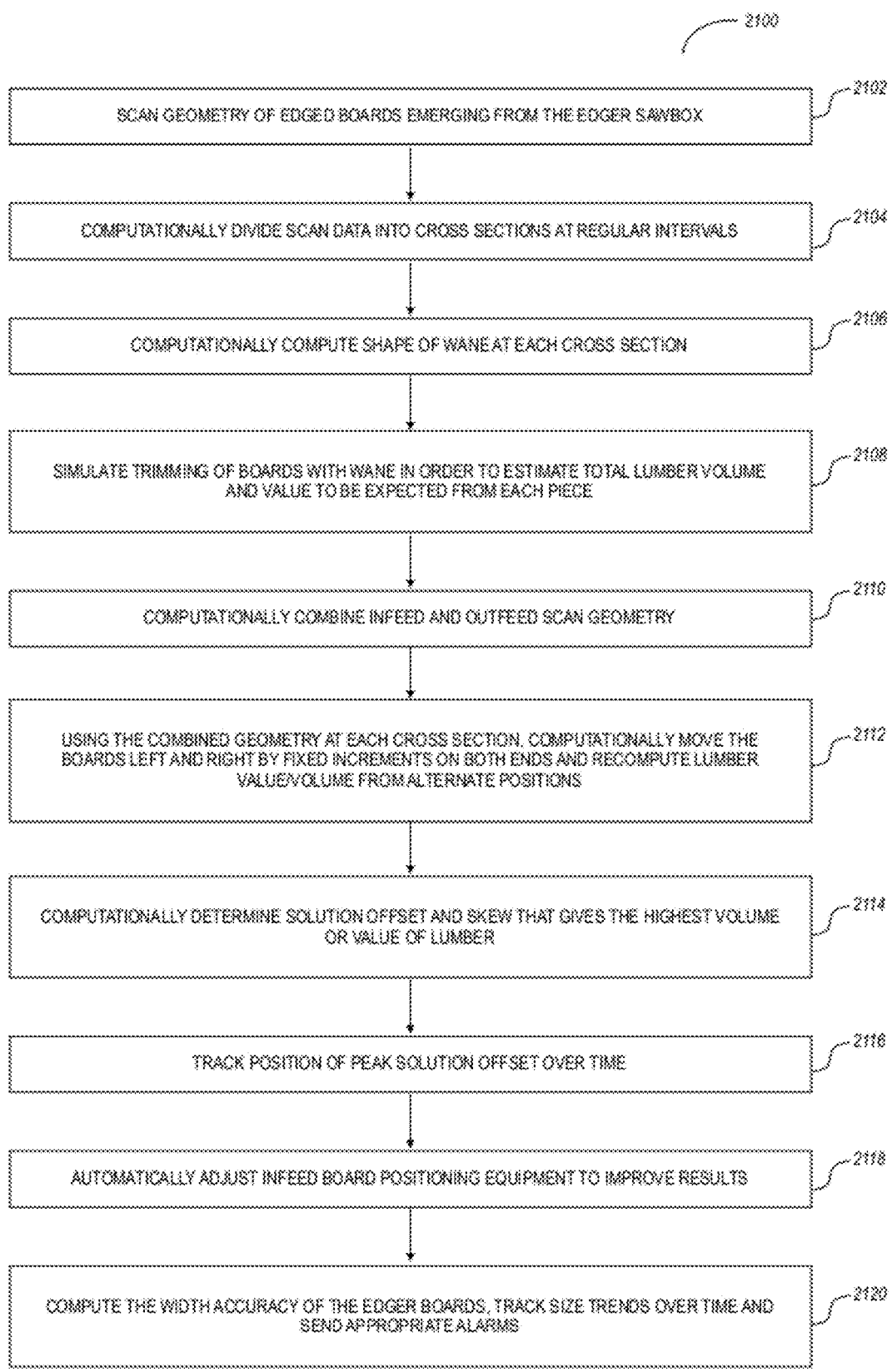
FIG. 21 is a flow diagram of a method of auditing sawmill performance and controlling the same relative to an edger outfeed scan zone, according to one illustrated embodiment.
Figure 22:
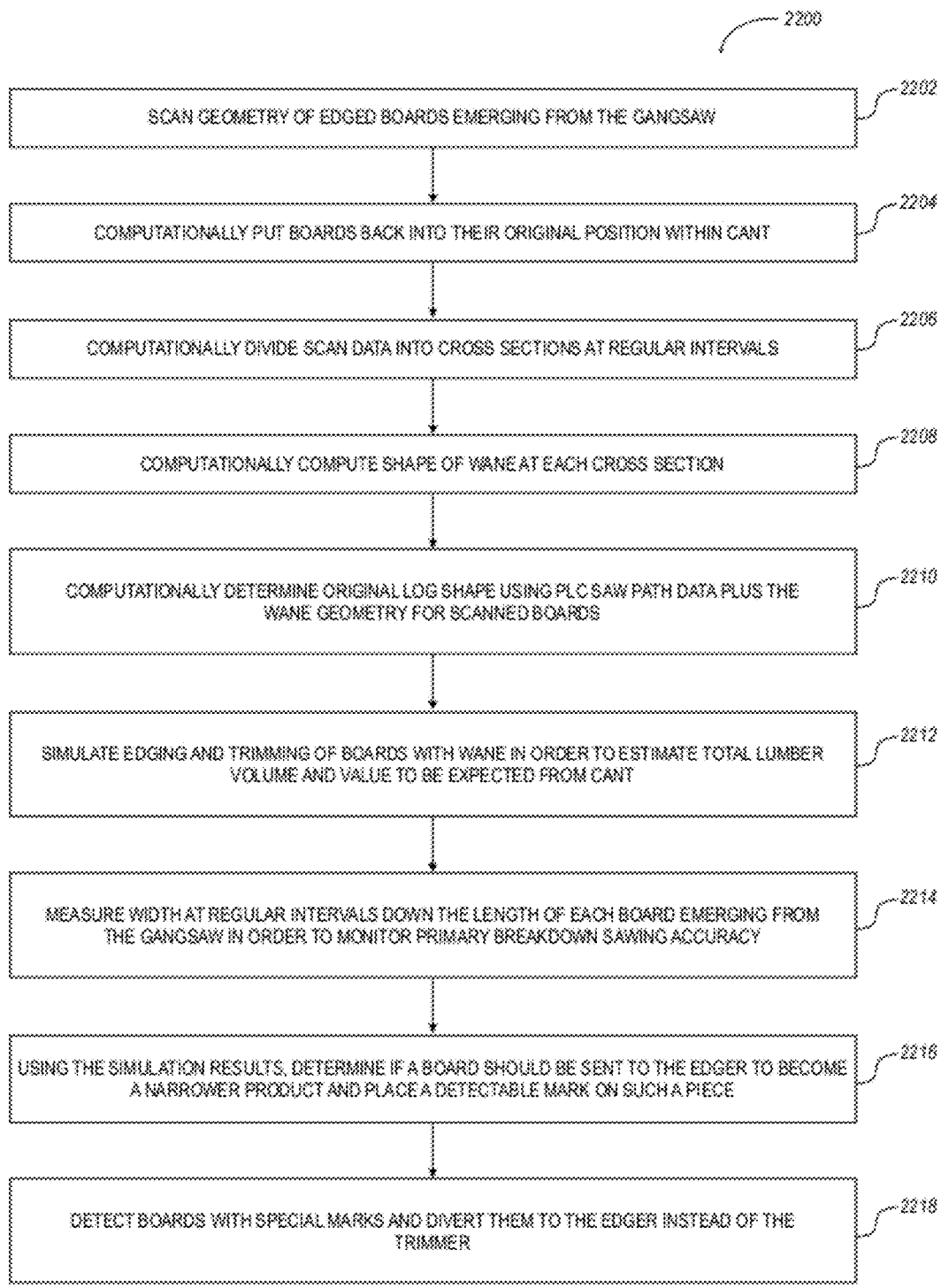
FIG. 22 is a flow diagram of a method of auditing sawmill performance and controlling the same relative to a gangsaw, according to one illustrated embodiment.
Figure 23:
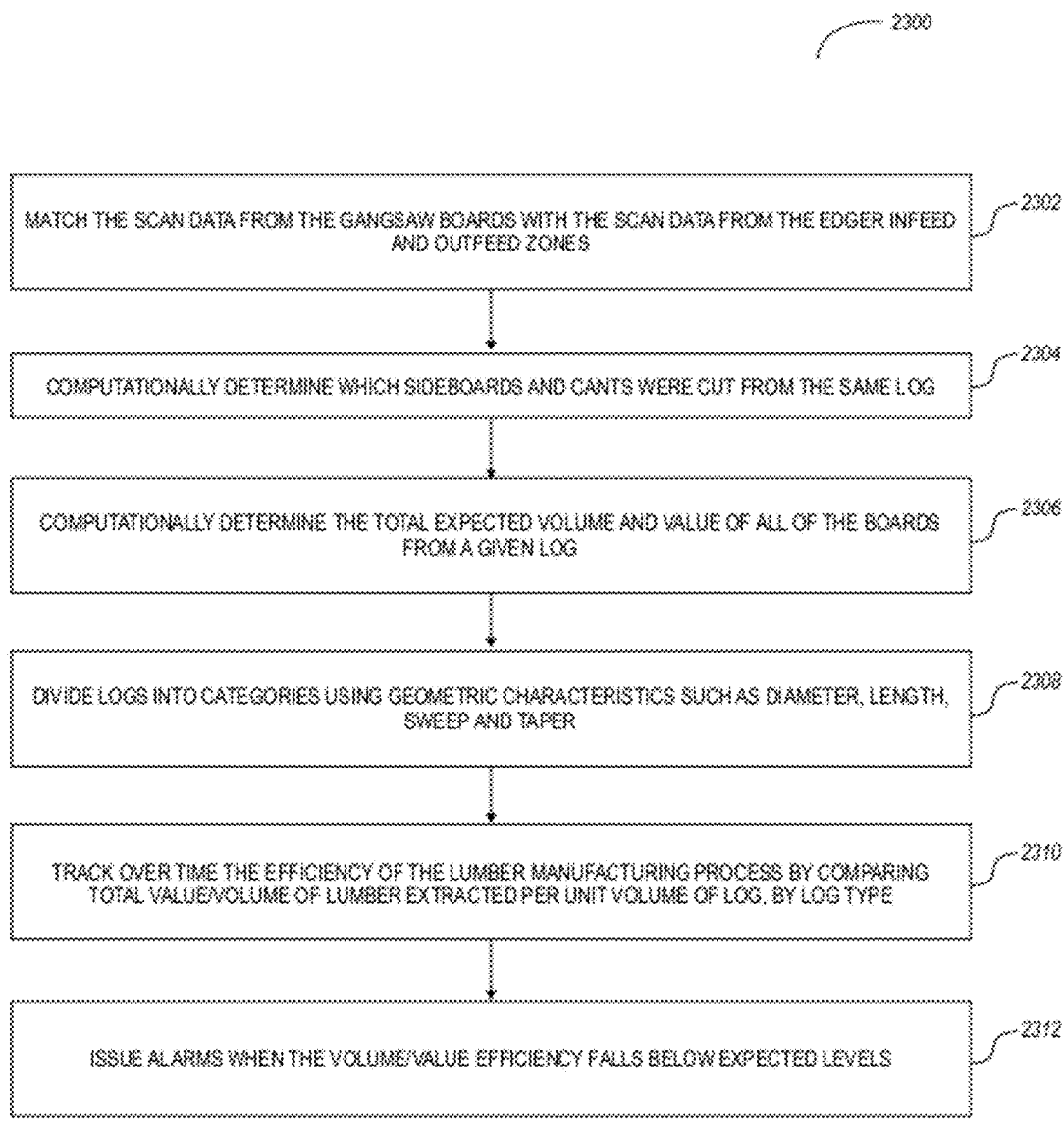
FIG. 23 is a flow diagram of a method of auditing sawmill performance and controlling the same using information collected by a gangsaw scan zone, an edger infeed scan zone, and edger outfeed scan zone, according to one illustrated embodiment.

The exemplary embodiment illustrated in FIG. 1 includes three scan zones that make up the sawmill audit system: 1) the edger infeed zone 106, 2) the edger outfeed zone 108 and 3) the gangsaw outfeed zone 104. The processes carried out at the three scan zones are illustrated in FIGS. 20, 21 and 22. FIG. 23 is an additional set of acts to be carried out by the sawmill audit computing device 124 by combining information from all three scan zones 106, 108, 104.

FIG. 20 shows a method 2000 of auditing sawmill performance and controlling the same relative to the edger infeed scan zone 106, according to one illustrated embodiment, which is describe with reference to various other Figures.

FIG. 11 provides an overall view of the edger process. The pieces to be edged arrive on the edger deck 1102. These pieces already have two parallel faces (i.e., upward facing face and downward facing face in FIG. 11) created at either the primary breakdown machine 112 (FIG. 1) or the gangsaw 114 (FIG. 1). FIG. 7 shows pieces cut from a typical cant, including outer piece 702 and outer piece 706 that each need further processing to become acceptable lumber. FIG. 5 shows the results of the primary breakdown process, which can produce sideboards such as 504, 506, 508 and 510 that need further processing by the edger 118 (FIG. 1).

A typical edger system such as the one depicted in FIG. 11 includes an infeed deck 1102 with some kind of scanning system, an optimizer computer for deciding how to cut each piece, and an infeed system 1104. The purpose of the infeed system is to skew and offset of the piece relative to a centerline per the optimizer solution, and then drop the piece onto a high speed chain to carry the piece to the edger saws (illustrated as horizontal lines) of the edger sawbox 1106. The high speed chain is depicted in FIG. 12 and is typically about 3 inches wide.

The edger 118 (FIG. 1) operation is sometimes carried out using chip heads but more commonly by two or more saws. For sawmills with large logs or producing only narrow lumber, the edger sawbox 1106 may have up to 5 saws. For example, a sawmill that produces only 2×4's might cut a 16 inch wide sideboard into four 2×4's. But even in such a sawmill, most of the pieces going through the edger sawbox 1106 will produce a single board.

As best illustrated in FIG. 11, the scan zone 106 is located downstream of the edger deck 1102 and upstream of the edger sawbox 1106. This allows a single planar scanner to see the entire length of the un-edged piece just prior to being edged. FIG. 12 provides a front elevation view of the scan zone 106, showing a planar laser 1202 looking down on the un-edged piece 1204 that is being held firmly against the infeed chain 1206 by overhead press rolls (not shown).

At 2002, a geometry of the un-edged piece is acquired or measured, for example using the planar laser 1202 to scan a geometry of the sideboards at the infeed 1104 of the edger 118 (FIG. 1). A commercially available laser for this purpose can measure up to 240 points across the field of view at a speed of 275 scans per second, and with a published accuracy of plus or minus 0.025 inches. At a typical standoff distance of 40 inches, the widest piece that can be measured in embodiment illustrated in FIG. 12 is approximately 20 inches. For each point on the surface of the un-edged board, the laser delivers an X and a Y coordinate value. The X value is the horizontal distance from a reference line (such as the machine center) to the given point. The Y value is the vertical distance from a reference line (typically the top of the chain 1206) to the given point. Such a laser scanner must be calibrated regularly to ensure that the measurements are correct.

A typical planar laser 1202 of the type used at edger infeed scan zone 106 is coupled to an encoder so that scans are spaced evenly down the length of each un-edged piece. At a typical edger speed of 700 feet per minute and a scan rate of 275 scans per second, the scanner is capable of generating approximately 2 cross sections per inch of travel to the computing device 124. Thus a typical piece 16 feet long may generate about 400 cross sections.

The un-edged piece shown in FIG. 12 is depicted as "wane up", meaning that the curved portion of the un-edge piece is visible to the planar laser 1202. Edgers 118 (FIG. 1) may process boards either wane up or wane down. Some of the operations described herein require wane up orientation for full benefit. In such cases, the wane down un-edged pieces may be ignored because there is a sufficient number of wane up un-edged pieces for sawmill audit and control purposes. In other cases, the sawmill may want to more aggressively use board flipping equipment (not shown) that is typically part of the edging system to ensure that more of the un-edged pieces are wane up.

At 2004, at least one processor or controller circuit computationally divides the scan data into cross sections at regular intervals down the length of the piece. A typical approach is to select some interval such as 6 inches for the cross sectional analysis. A processor-based device (e.g., computer device 124) then analyzes the cross section data from the raw scans, for example from 12 raw scans, smoothes and filters the data per standard techniques to construct a representative cross section that represents that 6 inch long portion of the un-edged piece.

At 2006, the audit and control system assembles the smoothed cross section data from the previous operation (204) in order to construct a plan view of the entire un-edged piece. FIG. 14 illustrates a number of example pieces that may be measured at the edger infeed scan zone 106. At this stage, the processor-based device (e.g., computer device 124) determines the direction of the sweep, which is the overall curvature. For example, piece un-edged 1404 has a pronounced sweep with "horns right" as viewed in the direction of travel while piece 1406 has the sweep "horns left".

Most primary breakdown systems orient the log segment to the "horns down" position, often using automatic computer controlled equipment to consistently achieve such. Thus, the sweep direction monitored at the edger infeed scan zone 106 can be used to determine the origin of the sideboard. If the un-edged piece is horns right on the edger infeed 1104, the un-edged piece originated on the right side of the log segment. If the piece is horns left on the edger infeed 1104, the un-edged piece originated on the left side of the log segment.

One simple algorithm for determining the sweep direction will be described. Other algorithms will be readily apparent to those of skill in the art in light of such. A point halfway between the left and right edges may be computed using the scan data at each smoothed cross section. A curve may be fit to the resulting points using standard computational curve fitting methods. The end points of the resulting curve may be computationally connected with a straight line. If the midpoint of the curve is to the left of the straight line, the sweep direction is computationally determined to be to the right. If the midpoint of the curve is to the right of the straight line, the sweep direction is computationally determined to the left.

The distance between the curve and the straight line is a measure of the amount of sweep. Some of the un-edged pieces may be from log segments that are so straight that there is little or even no detectable sweep. In this case, the processor-based device (e.g., computer device 124) may assign an origin of "unknown" to the un-edged piece. In most cases, however, the sweep direction and magnitude is sufficient for identification purposes.

At 2006, the processor-based device (e.g., computer device 124) may analyze the curved wane portions of the geometry of the un-edged piece to determine if the un-edged piece originated at an outside portion of the log segment, or originated from an inner portion of the log segment. For example, in FIG. 5 the outer sideboards 504 and 510 have steeper wane than the inner sideboards 506 and 508. The processor-based device (e.g., computer device 124) may fit a circular arc or other spline (e.g., B-spline, non-uniform rational B-spline) to the observed wane at each cross section. The processor-based device (e.g., computer device 124) may then computationally simulate the geometry of another piece parallel to this piece and of a standard thickness. The processor-based device (e.g., computer device 124) may then analyze the current piece to see if the current piece has sufficient face width and length to be an inner piece. If so, then the current piece is computationally determined to be or is characterized as an inner sideboard. Otherwise, the current piece is computationally determined to be or is characterized as an outer sideboard.

Also for example, this method would likely determine or characterize pieces 1402 and 1408 of FIG. 14 as likely being outer sideboards, and determine or characterize pieces 1404 and 1406 as likely inner sideboards.

The edger 118 (FIG. 1) also processes pieces from the gangsaw 114 (FIG. 1) that have too much wane. Unlike sideboards from the primary breakdown machine 112 (FIG. 1), these pieces are likely to already have parallel edges down the length, as best illustrated by un-edged piece 1410 (FIG. 14). Such pieces 1410 likely were produced using the left or right chip heads at the gangsaw infeed 604 (FIG. 6).

If the un-edged pieces 1402, 1404, 1406, 1408, 1410 shown in FIG. 14 were processed at the edger 118 (FIG. 1) in a wane down orientation, the overall shape would still be visible to the planar laser at the edger infeed scan zone 106. Therefore the audit system could still assign a left and right sideboard designation to the un-edged pieces, and will also see gangsaw pieces properly. However, the processor-based device (e.g., computer device 124) may not be able to correctly identify which pieces are inner sideboards and which are outer sideboards in the absence of wane data or information. Thus, the processor-based device (e.g., computer device 124) at 2006 can determine for at least a large portion of the edger pieces which machinery (e.g., primary breakdown machine 112, gangsaw 114) likely created the parallel surfaces that make up each piece.

Accurately monitoring the sawing accuracy of the primary breakdown machine 112, may allow the sawmill to adjust the machinery or stop production to fix a problem before the problem has affected a large number of sawn boards. At 2008, sawing accuracy is measured or otherwise determined. The location for edger infeed scan zone 106 has been selected to allow extremely accurate measurements using just one overhead scanner. This extreme accuracy is the result of several factors. One factor is the necessity for the edger infeed machinery to clamp the board tightly against the carry chain 1206 using overhead press rolls (not shown). This is required in order to support high acceleration rates employed in typical sawmills. It also means that the carry chain 1206 is very rigidly supported. Due to this structure, a single overhead planar scanner can accurately measure a distance from a top of the piece to the carry chain using only top data. Further, thickness information is available at every cross section, and also available from the smoothed cross section data from operation 2004 described above. The processor-based device (e.g., computer device 124) may use this information to compute three important statics: 1) the average thickness for each piece; 2) the end to end taper (front end versus rear end thickness), and 3) the sawing variation (usually expressed in terms of standard deviation).

The published accuracy for a typical planar laser scanner used for the edger infeed scan zone 106 is on the order of plus or minus 0.025 inches. However, this specification is over the entire operating range of the planer laser scanner and also over the normal operating temperature range. By using a narrow band of the laser data for precision measurements, and by automatically adjusting calibration using overall trends to counter such things as temperature and debris effects, the processor-based device (e.g., computer device 124) can deliver thickness monitoring accuracy of plus or minus 0.005 inches or better.

At 2010, the size information from operation 2008 may be combined with knowledge about the likely board position obtained during operation 2006 to determine performance trends for each saw and chip head in the primary breakdown machine 112. The processor-based device (e.g., computer device 124) can automatically adjust operation of the primary breakdown machine 112 and/or automatically issue or cause to be issued alarms to the sawmill personnel when a saw or chip head is performing below expectations and should be shut down or replaced.

FIG. 13 shows an alternative arrangement of scanner components to that illustrated in FIG. 12. The alternative arrangement includes a planer laser 1202 for monitoring the peripheral shape of the un-edged pieces plus the addition of two single point lasers 1302 that together enable more accurate measurement of thickness accuracy. The primary breakdown machine 112 (FIG. 1) often includes bandsaws 402, 404 (FIG. 4) for the sawing of log segments. Each saw 402, 404 has an upper and a lower saw guide (not shown) that provides additional stability to the saw for more accurate cutting. Commonly the upper guide moves vertically based on log diameter to reduce sawing variation to the extent possible. If there is a problem with one of the guides, a sideboard may develop what is called wedging. Wedging is an effect where the thickness at each edge of the sideboard is different. This is illustrated in FIG. 13 by the differences in thickness 1304, 1306 at opposed edges. In the absence of the bottom lasers such as in FIG. 12, the overhead laser may not be able to measure wedging with desired accuracy. Hence, the optional bottom lasers may improve overall accuracy, but at the added expense of more lasers and the maintenance challenge of keeping those lasers, which are mounted relatively below the boards, clean and unobstructed in what is typically a dirty (e.g., sawdust) environment.

FIG. 21 shows a method 2100 auditing sawmill performance and controlling the same relative to an edger outfeed scan zone, according to one illustrated embodiment. In particular, the method 2100 monitors edged lumber at an edger outfeed scan zone 108 as or after the edged lumber exits the edger sawbox 1106 (FIG. 11). The placement of the edger outfeed scan zone 108 will vary depending on the type of edger outfeed that is being employed. In many sawmills the edger outfeed consists of two belts with what is called an "edger picker" in between the belts. The second of the two belts is higher than the first of the two belts, typically by about 12 inches. The edged lumber, plus the edging strips that are to be sent to a chipper, exit the edger sawbox 1106 (FIG. 11) together on the first belt. Then the edged board or piece is diverted up to the second belt via adjustable ramps, while the edging strips continue straight ahead into the chipper conveyor.

Edger outfeed scan zone 108 may be located either to capture information from the first belt or the second belt. For example, FIG. 15 illustrates a planar laser scanner 1502 located above the second belt where two edged boards 1504 and 1506 have been created at the edger 118 (FIG. 1) and are traveling side by side in a lineal fashion. If the first belt were being illustrated, there would be two additional edging strips in the cross section view, one on the left of the boards 1504, 1506 and the other on the right of the boards 1504, 1506. The processor-based device (e.g., computer device 124) is able to obtain useful scan information from either location.

At 2102, a scanner scans the geometry of the edged boards that have emerged from the edger sawbox 1106 (FIG. 1) at the outfeed 1108 of the edger 112 (FIG. 1). Just as in the edger infeed scan zone, a planar laser can obtain raw cross section data at intervals of about 2 scans per inch of board travel. The scanner is typically tied into an encoder system to trigger scan events at regular and accurately spaced intervals down the length of each piece.

At 2104, the raw scan data is smoothed and filtered to create representative cross sections at regular intervals down the length of each piece, for example at every 6 inches along the length of the piece. As illustrated in FIG. 16, the processor-based device (e.g., computer device 124) can computationally generate a representation of the top view of the edged board using the filtered and smoothed data.

In a green sawmill, lumber grades are based on wane rules. The highest grade allows only a small amount of wane, while the lowest grade might allow a significantly larger amount of wane on the end product lumber. By way of an example, the lowest lumber grade may allow a minimum "nailing edge" of 40% of the thickness. The minimum nailing edge for a 2×4 would then be 0.6 inches (1.5×0.4). This same grade might allow a minimum face of 60%. So for an exemplary 2×4, the face would have to be 2.1 inches wide (3.5×0.6).

At 2106, the processor-based device (e.g., computer device 124) analyzes the wane at each cross section and compares the wane with the grade rules for minimum edge and minimum face.

At 2108, the processor-based device (e.g., computer device 124) determines the longest, most valuable board that can be created from the edged board through trimming. For example, FIG. 16 illustrates a board with significant wane on each end of the board plus some wane in the middle of the board. The processor-based device (e.g., computer device 124) has computationally determined that the left end of the board should be trimmed at the position indicated by reference number 1602, and the right end of the board should be trimmed at the position indicated by reference number 1604. The resulting board has wane in the middle 1606 that is acceptable for the given grade. Thus the processor-based device (e.g., computer device 124) can determine the final value for the edged board, using current pricing information.

At 2110, the processor-based device (e.g., computer device 124) computationally combines the data from the infeed scan zone 106 with the data from the outfeed scan zone 108. Since the speed of the edger 118 (FIG. 1) is generally fixed, there is a fixed number of seconds from the time an un-edged piece or board is scanned on the infeed conveyor to the time it arrives at the outfeed scan zone. Thus the data from infeed and outfeed scan zones, 106, 108, are offset in time by a predictable delay.

At 2112, the processor-based device (e.g., computer device 124) may simulate different edging results that would occur if the saw paths were adjusted slightly. At the edger infeed 104 the un-edged board or piece is often placed into a predetermined position by a two devices (commonly referred to as "fetcher pins"). There is a fetcher pin for the leading end, approximately 24 inches from the front end of the un-edged board or piece, and another fetcher pin near the trailing end. On edgers 118 (FIG. 1) handling variable length boards, it is common to have up to five fetcher pins to accommodate the various board lengths. The processor-based device (e.g., computer device 124) may receive a signal from a PLC of the edger system which signal is indicative of which fetcher pins were used on a particular board or piece. In this way the processor-based device (e.g., computer device 124) can simulate an offset right and an offset left for each fetcher pin, simulating the length and grade of the edged board or boards that would have been generated at the alternate positions. For example, the processor-based device (e.g., computer device 124) can compute offsets from the actual edged position that are plus or minus 0.5 inches left or right in increments of 0.1 inches, with equal adjustments simulated for the trailing end fetcher. Thus there are eleven possible positions for the front or leading end and eleven possible positions for the rear or trailing end, making a total of one hundred and twenty one simulated positions. As part of this operation the processor-based device (e.g., computer device 124) computes a length, grade and value of the resulting lumber for each simulated position.

At 2114, the processor-based device (e.g., computer device 124) combines the results for the simulated edging positions to determine the best solution for a given board or piece, keeping track of the result by fetcher pin.

At 2116, the processor-based device (e.g., computer device 124) tracks the peak offset positions over time and displays the results for system tuning, error reporting and the issuance of appropriate alarms.

At 2116, the processor-based device (e.g., computer device 124) generates a positive or negative adjustment for each fetcher pin that compensates for detected or observed errors in the positioning, transport or saw placement. At 2118, the processor-based device (e.g., computer device 124) sends adjustment values to the PCL of the edger 118 (FIG. 1), for example on a regular schedule for instance as often as every 10 minutes. Such adjustments improve the length and value recovery of the edger system. In addition, the processor-based device (e.g., computer device 124) issues an alarm or causes an alarm to be issued to the sawmill personnel when the calculated adjustments reach defined limits that indicate there is a possible mechanical problem with the fetcher pins or transport equipment.

At 2120, the sawmill audit system measures the width of the edged lumber, and associates the sawing accuracy to the specific saws that created the width using data from the PLC of the edger 118 (FIG. 1).

FIG. 22 is a flow diagram of a method 2200 of auditing sawmill performance and controlling the same relative to a gangsaw, according to one illustrated embodiment. In particular, FIG. 22 shows a method that scans boards that have been completely sawn by a gang at a scan zone 104 (FIG. 1). The teachings herein may be combined with those of U.S. Pat. No. 7,853,349, which is incorporated herein by reference in its entirety. That patent illustrates several approaches to scanning the geometry of lumber coming from a cant. That patent teaches how to analyze the geometry of the boards and to use the information to manage the entire cant processing system.

At 2202, the scanners 802, 804 scan the geometry of the boards emerging from the gangsaw, after they have been completely sawn. FIG. 8 illustrates one embodiment of the gangsaw outfeed scan zone 104 consisting of four planar laser scanners arranged to capture geometric information as the lumber proceeds lineally through the gangsaw outfeed scan zone 104. Data from the top lasers 802 (two shown, only once called out in FIG. 8) may be combined with data from bottom lasers 804 (two shown, only one called out in FIG. 8) to produce geometric information about each board or piece.

At 2204, the processor-based device (e.g., computer device 124) computationally puts the boards back into their original position within the cant, for example using methods and techniques described in U.S. Pat. No. 7,853,349. At 2206, the processor-based device (e.g., computer device 124) divides the raw scan data into cross sections, and filters and smoothes the data to produce representative cross sections at regular intervals, for example at every 6 inches down the length of each board or piece.

At 2210, the processor-based device (e.g., computer device 124) monitors the location of the gang sawbox 608 (FIG. 6) as a cant is processed. The processor-based device (e.g., computer device 124) uses the location information to construct a sawpath diagram, for example as illustrated in FIG. 9. The plan view of cant 502 shows curved sawlines 910 that derive from such data. By combining the scanned geometry of the boards or pieces with the curve path information, the processor-based device (e.g., computer device 124) may computationally construct the original shape of the un-processed cant.

At 2212, the processor-based device (e.g., computer device 124) computationally simulates further edging and trimming operations needed by the outer boards in order to produce an estimated total volume and value for the cant lumber. Referring to FIG. 9, an outside piece 706 has been analyzed to determine the dimensions of the board 902 that can be expected to be produced after further edging and trimming operations. The width 904 of the final board and the trimmed length 906 are based on wane rules and lumber values. When combined with the results from computationally simulating board 908 on the opposite side of the cant, the processor-based device (e.g., computer device 124) can compute a total value and volume for the entire cant.

With respect to monitoring the accuracy of the primary breakdown machinery, at 2214 the planar laser scanners 802, 804 (FIG. 8) may be used to measure the width of the boards from the cant. Even though the published accuracy of the exemplary lasers is plus or minus 0.025 inches, there is enough raw cross section data down the length of each piece to allow data smoothing and filtering that can improve the useable accuracy to plus or minus 0.005 inches. Saw blades are generally incapable of sudden changes of direction short of a catastrophic event. Instead, saw blades move or oscillate in a more gradual way. Thus in a short distance of say 12 inches, the width of a board or piece should be consistent. Since the planar lasers can gather cross section data at the rate of 2 scans per inch, there are approximately 24 raw cross sections to use for filtering and averaging for a one foot zone. Furthermore, the relative accuracy of the scanners 802, 804 over the length of a board or piece is higher than the published accuracy that must take into account such factors as temperature change.

Referring again to FIG. 8, a width of one board 702 may be compared with the width of another board 706. A logical conclusion of the two widths being different is that the cant from which these boards were cut had a wedging defect. An example of wedging is evident in FIG. 5, where the dimension C may be different on the top of the cant versus the bottom of the cant because the left and right bandsaws were not cutting parallel lines through the log segment. Wedging defects are most often due to saw guides.

Figure 19:
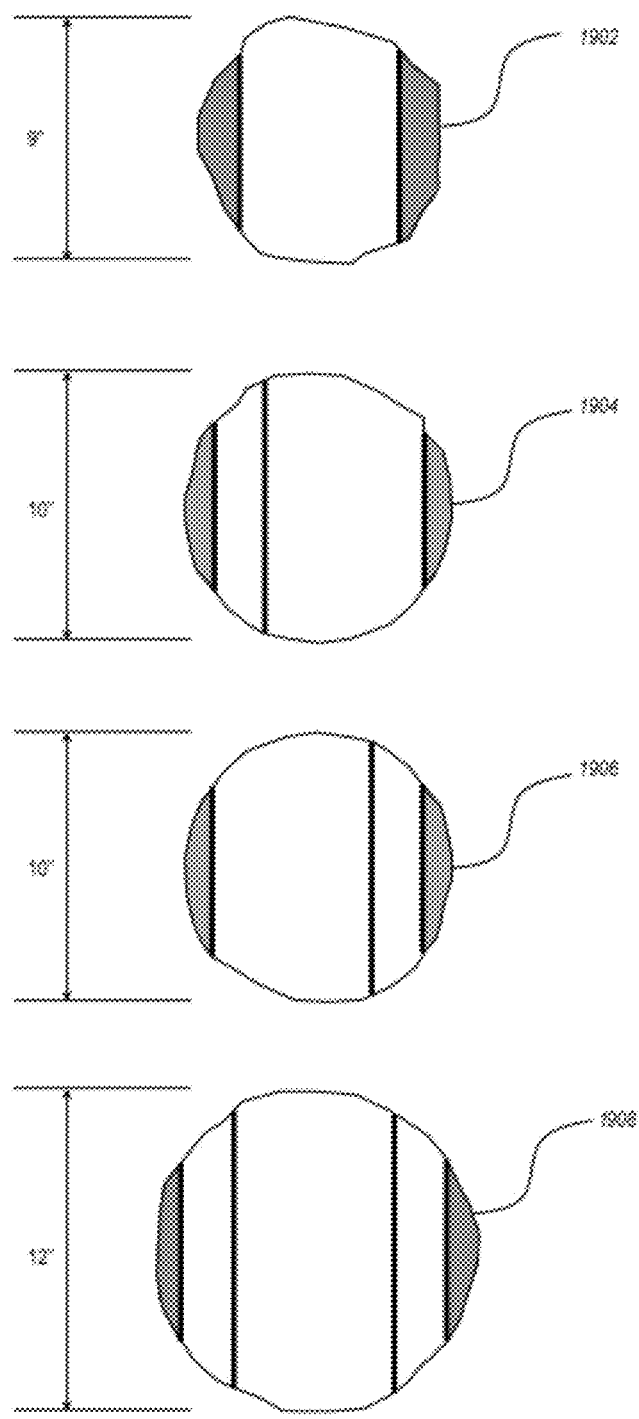
FIG. 19 is are front elevational views of four log segments processed four different ways to illustrate how a cant geometric shape and/or size may be used to determine which machines processed the log segment to produce the cant, according to one illustrated embodiment.

It is desirable to logically associate defects in cant size with the primary breakdown machinery 112 that produced the defect. The processor-based device (e.g., computer device 124) computationally determines which saws or chip heads were involved by analyzing the overall simulated cant shape. For example, FIG. 19 shows simulated four cant types, each based on which cutting tools were used to produce the respective cant type. For instance, a first simulated cant 1902 has been processed from a log segment using only chip heads. This can be determined by analyzing the shape of the resultant cant to see if there is enough extra fiber to make sideboards. Also for instance, a second simulated cant 1904 has been processed from a slightly larger log segment, that has been processed with one sideboard on the left and a chip head on the right. The resultant cant 1904 will have a wide face on one side plus a narrow face on the other. The wide face was produced by a saw, and the narrow face produced by a chip head.

If the processor-based device (e.g., computer device 124) encounters such a cant 1904, the question is whether the sawn face was on the left as shown with respect to cant 1904, or whether the sawn face was on the right as shown with respect to can 1906. The question may be answered by analyzing the sweep orientation and combining that information with knowledge of the horns down nature of most primary breakdown systems. If the cant is symmetrical and the faces are wide enough, the processor-based device (e.g., computer device 124) will assume that there are saws on both sides as illustrated by simulated cant 1908. Thus the width accuracy of the boards may be traced back to the primary breakdown saws and/or chip heads that created the width in the first place.

At 2216, the processor-based device (e.g., computer device 124) uses the simulation results from operation 2212 to create or implement a drop operator optimizer system. Referring to FIG. 6, the boards from a gangsaw are commonly transported to a drop operator (i.e., machine and/or human) that operates what is called a "flop gate" to divert some of the gang boards to the edger 118 (FIG. 1) for further processing. As illustrated, board 624 has been diverted onto belt 620 to carry it back to the edger system.

Figure 10:
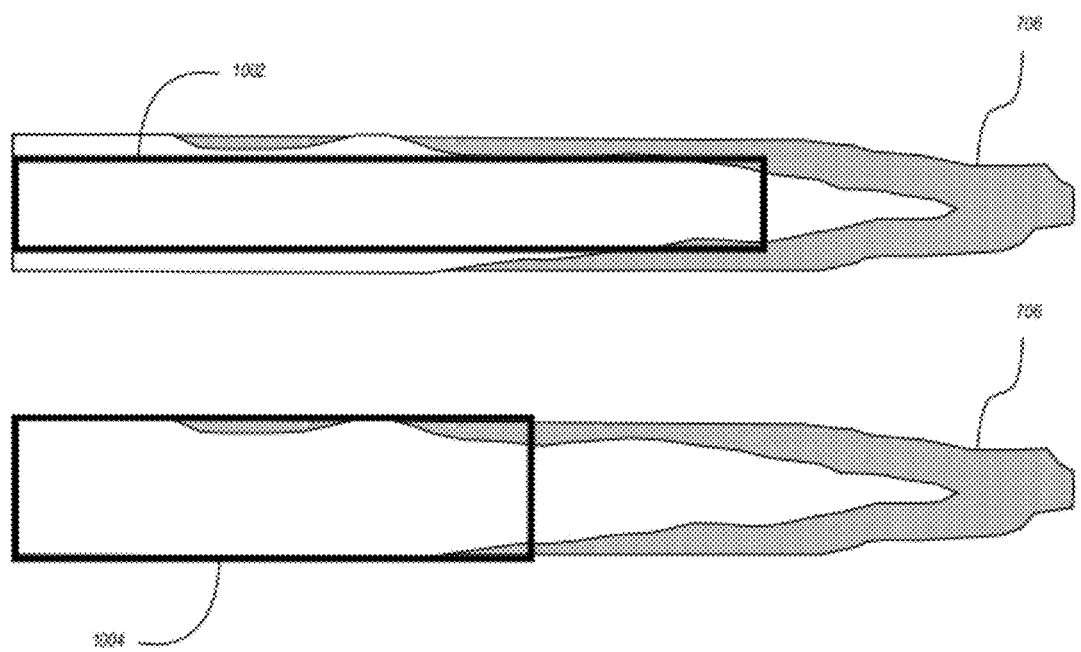
FIG. 10 is a plan view of exemplary cant sideboards that can be further processed with or without being sent to the edger machine center.

The decision to send a piece back to the edger 118 is a difficult one for at least two reasons. Firstly, the outside boards from the cant tend to fall with the wane down (e.g., see boards 702 and 706 in FIG. 8). These wane down boards must be flipped wane up to enable an informed decision. Secondly, the tradeoffs between edging a piece or trimming the piece to a shorter length need to be understood and computed or otherwise assessed. FIG. 10 illustrates the two options for a board or piece 706. A first option simulates sending the board 706 to the edger 118 (FIG. 1) and then to the trimmer 120 (FIG. 1), resulting a (simulated) board 1002. The resultant simulated board 1002 could, for example, be a 2×6 that is 14 feet in length. A second option simulates simply trimming the board 706 without edging, resulting in a (simulated) board 1004. The resultant simulated board 1004 may, for example, be a 2×8 that is 10 feet long. The decision about which option to choose depends on a proper analysis of lumber value or prices by wane grades, and also difference in chip volume in the two cases. A computer can make this kind of decision accurately and consistently in real time, and may also be managed and adjusted by managers as needed.

The communication of the proper decision to the drop operator can be easily accomplished by using markers (e.g., visual markers, wireless transponders). For instance, a simple paint spray system mounted downstream of the gangsaw outfeed scan zone 104 may be employed. Using simulation data from operation 2212, the processor-based device (e.g., computer device 124) decides whether to send a given board to the edger 118 (FIG. 1). If the decision is yes, the processor-based device (e.g., computer device 124) may cause the paint spray system to fire a short burst of paint onto the given board via one of a series of nozzles, for instance spaced evening across the width of the rollcase.

At 2218, in response to the drop operator detecting a marked (e.g., painted) board, the drop operator may cause the marked board to be dropped to the edger belt. This may be advantageously accomplished without any need to flip the board over, thus improving the production capacity of the drop operator station. Such may be implemented automatically, for instance via a machine vision system with one or more cameras that acquire images which either include or do not include visual markings and which is communicatively coupled to control a drop gate. Such may be implemented automatically, for instance via a wireless interrogator system such as a radio frequency identification (RFID) interrogator or an electronic article surveillance (EAS) interrogator and which is communicatively coupled to control a drop gate. Such may be implemented manually, for example by a human who operates a switch that controls a drop gate.

The benefits of better decision making at the drop station are substantial because any board or piece dropped to the edger 118 (FIG. 1) that should have been sent directly to the trimmer 120 will slow the operation of the edger 118. Such a board or piece must be blanked through the edger 118, taking up a valuable lug. Similarly, if a mistake is made and a piece that should have been edged mistakenly arrives directly at the trimmer 120 without first being edged, the trimmer optimizer system must drop that piece to an edger return belt, thus wasting a lug on the trimmer 120.

FIG. 23 is a flow diagram of a method 2300 of auditing sawmill performance and controlling the same using information collected by a gangsaw scan zone 104, an edger infeed scan zone 106, and edger outfeed scan zone 108, according to one illustrated embodiment. In particular, the method 2300 advantageously makes use of the combined data from the three scan zones 104, 106 and 108 in order to audit the entire sawmill process.

At 2302, the gang scan zone 104 collects, and optionally stores, cant face information. Such information may, for example, take the form of the information described above in reference to act 2210 (FIG. 22). Such information may, for instance, be stored in a time stamped queue. At the same time, the edger infeed scan zone 106 collects, and optionally stores sideboard geometric information. Such information may, for example, take the form of the information described in reference to act 2006 (FIG. 20). Such information may, for instance, be stored in a second time stamped queue.

At 2304, the processor-based device (e.g., computer device 124) determines which sideboards and cants were cut from the same log segment. A suitable approach is illustrated in FIG. 17. As illustrated, a cant 1702 and a sideboard 1704 are evaluated for matching. The cant 1702 and sideboard 1704 are candidates for matching because their time stamps are within defined or reasonable limits for making a match based on time and sequence. The processor-based device (e.g., computer device 124) may compute a matching score in a number of ways. One way is to first measure a face width at regular intervals (e.g., every 6 inches) down the length of the cant or sideboard. Then compute a point halfway between the left and right wane boundaries at each cross section. A location of a least squares line through the center points may then be computed. The same computations may be performed for a peripheral shape of the given sideboard, including the computation of center points and fitting of a least squares line through the points. For each cross section on the two pieces, a distance from the fitted straight line to the actual center point may be computed. By way of example, a first cross section center point on a cant face might be 1.5 inches to the left of a straight line. A width of the face at this location might be 8.5 inches. The sideboard that is being tested for a match might have a centerline that is 1.3 inches to the left of a fitted straight line, and have an overall width of 8.8 inches. The matching score for this cross section would be the absolute value of the difference between these two measurements. In this example, the score would be a 0.2 shape error plus a 0.3 width error for a total of 0.5 inches. Repeating this process at every cross section will yield a total matching score. The score at a perfectly matched cross section would be zero. The sum of the matching scores over the length of the piece will allow the system to find good matches.

The matching process is not limited to just matching sideboards to cants. The matching may also be used to match sideboards with other sideboards. Such may be useful with a quad bandsaw system that is producing multiple sideboards on a given side.

It may be that not every cant will have matching sideboards. Such may, for example, be the result of scanner data issues such as processing lumber at the edger wane down. However, there will be enough good matches to allow effective monitoring using a partial sampling of the log population.

At 2306, the processor-based device (e.g., computer device 124) computationally determines a total expected volume and value of all boards from a given log segment from the collected data and lumber value or prices. Such may be computed all log segments in which a cant and matching sideboards have been found. The total volume and value of cant lumber may have been previously determined, for example at 2212 (FIG. 22). A total volume and value for edged boards may have been previously determined, for example at 2108 (FIG. 21). After the matching of sideboards to cants is accomplished, the total value and volume of cant lumber and sideboard lumber are summed at 2306 to arrive at a total lumber recovery from the given log.

At 2308, the processor-based device (e.g., computer device 124) computationally constructs an estimated log segment size and shape using the data from the matched cant and sideboard geometries. The processor-based device (e.g., computer device 124) further classifies the log segments using criteria such as small end diameter, log segment length, taper and sweep. It then computes a statistic such as average lumber recovery per unit volume of logs or alternatively the total lumber value per unit volume of logs.

At 2310, the processor-based device (e.g., computer device 124) tracks the lumber recovery trends over time for selected log categories. At 2312, the processor-based device (e.g., computer device 124) issues alarms or causes alarms to be issued when a volume or value efficiency falls below expected or defined levels.

In addition to alarms, the overall recovery tracking data will be used to quickly test process improvement ideas. Since sawmills have thousands of variables that can be tweaked, this capability will result in much more rapid advances in sawmill efficiency.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information can be stored on any computer readable medium for use by or in connection with any computer and/or processor related system or method. In the context of this document, a memory is a computer readable medium that is an electronic, magnetic, optical, or other physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information. In the context of this specification, a "computer readable medium" can be any means that can store, communicate, propagate, or transport the program associated with logic and/or information for use by or in connection with the instruction execution system, apparatus, and/or device. The computer readable medium can be, for example, but is not limited to, an electronic, magnetic, optical, electromagnetic, infrared, or semiconductor system, apparatus, device, or propagation medium. More specific examples (a nonexhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. U.S. Pat. Nos. 7,853,349 and 7,866,642; U.S. Patent Application Publication Nos. 2009-0090065377 and 2009-0255607; and U.S. patent application Ser. No. 61/450,011 filed Mar. 7, 2011 and Ser. No. 13/366,028 filed Feb. 3, 2012, are each incorporated herein by reference, in their entirety. Aspects of the embodiments can be modified, if necessary to employ concepts of the various patents, application and publications to provide yet further embodiments.

Some implementations may include additional scan zones. In some implementations one or more scan zones may not be associated with a specific computer optimizer, and the scanning devices in such scan zones may be coupled directly to the computing device 124. In some embodiments, the computing device 124 alone may provide all of the optimization capabilities provided by the plurality of computer optimizers described above.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation of a mill equipment audit system, the method comprising:
    receiving image information by a processor-based mill equipment audit processing system;
    receiving position related information from a machine controller that controls at least one piece of mill machinery, the information indicative at least of a position of at least one cutting element relative to a piece of wood being cut for each of a plurality of pieces of wood;
    characterizing each of a plurality of boards based on the received image information and the received position information by the processor-based mill equipment audit processing system;
    logically associating the respective board with a single pair of cutting devices which produced the respective board by the processor-based mill equipment audit processing system based on the characterization of at least the respective board; and
    for each of a number of sets of the boards:
        creating a virtual representation of a cant based at least in part of the image information; and
        determining a saw path through the virtual representation of the cant based at least in part on the information indicative of a sawing path of the gang saw with respect to a chipped cant from which the boards of the respective set of boards have been sawn.

2. The method of claim 1 wherein receiving position related information from a machine controller that controls at least one piece of mill machinery includes receiving information from a gangsaw controller indicative of a sawing path of the gang saw with respect to a cant.

3. The method of claim 1, further comprising:
    based on image information indicative of an amount of wane appearing on at least some of the boards, creating a virtual representation of an original cant from which the chipped cant was produced.

4. The method of claim 3, further comprising:
    based in the virtual representation of the original cant, determining whether the original cant has two chipped sides, a chip left side and sawed right side, a sawed left side and chipped right side, or two sawed sides.

5. The method of claim 1 wherein receiving position related information from a machine controller that controls at least one piece of mill machinery includes receiving information from a primary breakdown controller indicative of a position of at least one chip head with respect to a log segment.

6. The method of claim 1, further comprising:
    storing to at least one nontransitory processor-readable medium information indicative of a relationship between curvature, speed and sawing accuracy.

7. The method of claim 1 wherein receiving image information by a processor-based mill equipment audit processing system includes receiving image information from a single planer laser scanner positioned at least proximate an infeed of an edger of the mill.

8. The method of claim 7 wherein receiving image information by a processor-based mill equipment audit processing system includes receiving image information from two point laser scanners positioned at least proximate an infeed of an edger of the mill.

9. The method of claim 7 wherein receiving image information by a processor-based mill equipment audit processing system includes receiving image information from at least one planer laser scanner positioned at least proximate an outfeed of an edger of the mill.

10. The method of claim 7 wherein receiving image information by a processor-based mill equipment audit processing system includes receiving image information from at least one laser scanner positioned at least proximate at least one of an infeed or an outfeed of a gangsaw of the mill.

11. A mill equipment audit system, comprising:
    a number of scanners positioned to provide image information from each of a number of pieces of mill equipment; and
    a processor-based mill equipment audit processing system communicatively coupled to the number of scanners, and which includes at least one processor and at least one non-transitory processor-readable medium communicatively coupled to the at least one processor and which stores at least one of processor executable instructions or data, which when executed by the processor causes the at least one processor to:
        receive image information by a processor-based mill equipment audit processing system;
        receive position related information from a machine controller that controls at least one piece of mill machinery, the information indicative at least of a position of at least one cutting element relative to a piece of wood being cut for each of a plurality of pieces of wood;
        characterize each of a plurality of boards based on the received image information and the received information by the processor-based mill equipment audit processing system;
        logically associate the respective board with a single pair of cutting devices which produced the respective board by the processor-based mill equipment audit processing system based on the characterization of at least the respective board; and
        for each of a number of sets of the boards:
            create a virtual representation of a cant based at least in part on the image information; and
            determine a saw path through the virtual representation of the cant based at least in part on the information indicative of a sawing path of a gang saw with respect to a chipped cant from which the boards of the respective set of boards have been sawn.

12. The mill equipment audit system of claim 11 wherein the at least one processor receives information from a gangsaw controller indicative of a sawing path of the gang saw with respect to a cant.

13. The mill equipment audit system of claim 11 wherein the at least one processor further:
    creates a virtual representation of an original cant from which the chipped cant was produced based on image information indicative of an amount of wane appearing on at least some of the boards.

14. The mill equipment audit system of claim 13 wherein the at least one processor further:
   determines whether the original cant has two chipped sides, a chip left side and sawed right side, a sawed left side and chipped right side, or two sawed sides based on the virtual representation of the original cant.

15. The mill equipment audit system of claim 11 wherein the at least one processor receives information from a primary breakdown controller indicative of a position of at least one chip head with respect to a log segment.

16. The mill equipment audit system of claim 11 wherein the at least one processor further:
   stores to the at least one nontransitory processor-readable medium information indicative of a relationship between curvature, speed and sawing accuracy.

17. The mill equipment audit system of claim 11 wherein the at least one processor receives the image information from a single planer laser scanner positioned at least proximate an infeed of an edger of the mill.

18. The mill equipment audit system of claim 11 wherein the at least one processor receives the image information from two point laser scanners positioned at least proximate an infeed of an edger of the mill.

19. The mill equipment audit system of claim 11 wherein the at least one processor receives the image information from at least one planer laser scanner positioned at least proximate an outfeed of an edger of the mill.

20. The mill equipment audit system of claim 11 wherein the at least one processor receives the image information from at least one laser scanner positioned at least proximate at least one of an infeed or an outfeed of a gangsaw of the mill.

* * * * *

UNITED STATES PATENT AND TRADEMARK OFFICE
CERTIFICATE OF CORRECTION

PATENT NO. : 9,827,643 B2
APPLICATION NO. : 13/413460
DATED : November 28, 2017
INVENTOR(S) : Earl Barker Page 1 of 1

It is certified that error appears in the above-identified patent and that said Letters Patent is hereby corrected as shown below:

In the Specification

In Column 8, Line 4, delete "is are" and insert -- is a --, therefor.

In Column 25, Line 15, delete "can" and insert -- cant --, therefor.

In Column 28, Line 10, delete "and or" and insert -- and/or --, therefor.

Signed and Sealed this
Twenty-seventh Day of February, 2018

Andrei Iancu
*Director of the United States Patent and Trademark Office*